United States Patent
Kruzel et al.

(10) Patent No.: US 10,923,892 B2
(45) Date of Patent: Feb. 16, 2021

(54) CABLE CLEAT ASSEMBLY

(71) Applicant: Panduit Corp., Tinley Park, IL (US)

(72) Inventors: Mateusz Kruzel, Orland Park, IL (US); Kenneth A. Christensen, Naperville, IL (US); Rodney G. Rouleau, Manhattan, IL (US); Brett J. Putnam, Plainfield, IL (US); Mark D. Campbell, Beecher, IL (US); Balaji Kandasamy, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/587,190

(22) Filed: Sep. 30, 2019

(65) Prior Publication Data

US 2020/0028338 A1    Jan. 23, 2020

Related U.S. Application Data

(63) Continuation-in-part of application No. 16/426,521, filed on May 30, 2019.

(60) Provisional application No. 62/682,438, filed on Jun. 8, 2018.

(51) Int. Cl.
*H02G 3/04* (2006.01)
*F16L 3/10* (2006.01)

(52) U.S. Cl.
CPC .......... *H02G 3/0456* (2013.01); *F16L 3/1075* (2013.01)

(58) Field of Classification Search
CPC ......... H02G 3/0456; F16B 2/10; F16L 3/1075
See application file for complete search history.

(56) References Cited

U.S. PATENT DOCUMENTS

| | | | | |
|---|---|---|---|---|
| 587,775 A | * | 8/1897 | Yockel | F16L 3/1066 248/75 |
| 2,915,096 A | * | 12/1959 | Mooney | B25B 5/103 269/157 |
| 2,934,803 A | * | 5/1960 | Allen | F16B 2/10 403/245 |
| 3,893,813 A | * | 7/1975 | Johnson | B01L 9/50 422/564 |
| 4,179,774 A | | 12/1979 | Bradbury | |
| 4,563,109 A | * | 1/1986 | Ortemond | E02B 17/00 24/514 |
| 6,135,398 A | | 10/2000 | Quesnel | |

(Continued)

FOREIGN PATENT DOCUMENTS

| | | |
|---|---|---|
| DE | 563592 C | 8/1938 |
| DE | 3623228 A1 | 1/1988 |

(Continued)

*Primary Examiner* — Bradley Duckworth
(74) *Attorney, Agent, or Firm* — Christopher S. Clancy; James H. Williams; Aimee E. McVady

(57) ABSTRACT

A cable cleat assembly secures a bundle of cables to a ladder rack. The cable cleat assembly includes a base and two side bodies. Each side body is pivotally mounted to one of the ends of the base. Each side body has a first end, a middle section, and a second end. The first end of each side body includes a mounting member. The mounting member has a peg extending from each side of the mounting member and a circumferential rib. The pegs are mounted in the base with the circumferential rib positioned between alignment ribs extending from the base to enable the side bodies to pivot from an open position to a closed position.

8 Claims, 29 Drawing Sheets

(56) References Cited

U.S. PATENT DOCUMENTS

| | | | |
|---|---|---|---|
| 7,703,358 B2 * | 4/2010 | Ubinana Felix | E04G 17/04 |
| | | | 249/219.2 |
| 8,500,073 B2 | 8/2013 | Quesnel | |
| 8,720,841 B2 * | 5/2014 | Morren | F16B 2/10 |
| | | | 248/316.5 |
| 8,910,928 B2 * | 12/2014 | Header | F16B 2/10 |
| | | | 269/91 |
| 9,106,069 B2 | 8/2015 | Frizzell | |
| 9,551,438 B2 | 1/2017 | Frizzell | |
| 10,100,950 B2 * | 10/2018 | Van Der Mik | F16L 3/1008 |
| 10,190,609 B2 * | 1/2019 | Turturro | A61B 90/57 |
| 10,238,790 B2 * | 3/2019 | Toro | A61M 5/14 |
| 10,428,975 B2 * | 10/2019 | Nijdam | F16L 3/1041 |
| 10,697,482 B2 * | 6/2020 | Turturro | F16B 2/10 |
| 2009/0139156 A1 | 6/2009 | Magno, Jr. et al. | |
| 2020/0028338 A1 * | 1/2020 | Kruzel | H02G 3/0456 |

FOREIGN PATENT DOCUMENTS

| | | |
|---|---|---|
| EP | 2571124 A1 | 3/2013 |
| EP | 2772999 A1 | 9/2014 |
| FR | 714483 A | 11/1931 |
| GB | 722084 | 1/1955 |
| GB | 758160 | 10/1956 |
| GB | 1096000 | 12/1967 |
| GB | 1213185 | 11/1970 |
| GB | 2256672 A | 12/1992 |
| GB | 2284444 A | 7/1995 |
| GB | 2324568 A | 10/1998 |
| GB | 2339237 B | 6/2001 |
| GB | 2405900 A | 3/2005 |
| GB | 2473492 A | 3/2011 |
| JP | 2000197244 A | 7/2000 |
| WO | 2014131583 A1 | 9/2014 |

\* cited by examiner

CABLE CLEAT ASSEMBLY

CROSS REFERENCE TO RELATED APPLICATIONS

This application is a continuation-in-part of U.S. patent application Ser. No. 16/426,521, filed on May 30, 2019, which claims the benefit of U.S. Provisional Application No. 62/682,438, filed on Jun. 8, 2018, the subject matter of which is hereby incorporated by reference in its entirety.

FIELD OF THE INVENTION

The present invention relates to cable cleats, and more particularly to a cable cleat for securing cables during a short circuit event.

BACKGROUND OF THE INVENTION

Cable cleats have been typically used to manage and secure 3-phase power cables of various sizes in a trefoil arrangement along a ladder rack or tray. The cable cleats secure the cables laterally and axially. The cable cleat must be rigid enough to retain cables during short circuit events, where electromagnetic forces can cause the cables to repel one another at extremely high forces. If a short circuit event occurs, the cables can separate when exposed to a large amount of force. Cable cleats are generally designed to resist the movement of cables during these short circuit events to prevent damage to people and property.

It is desirable to provide an improved cable cleat design that prevents movement of the cables during a short circuit event.

SUMMARY OF THE INVENTION

A cable cleat assembly secures a bundle of cables to a ladder rack. The cable cleat assembly includes a base and two side bodies. The base is secured to the ladder rack. The two side bodies are pivotally mounted to the ends of the base. Each side body has a first end, a middle section, and a second end. The first end of each side body includes a mounting member. The mounting member has a peg extending from each side of the mounting member and a circular rib. The pegs are mounted in the base and the circular rib engages a slot between alignment tabs extending from the base to enable the side bodies to pivot from an open position to a closed position around the bundle of cables on the ladder rack.

DETAILED DESCRIPTION

Figure 1:
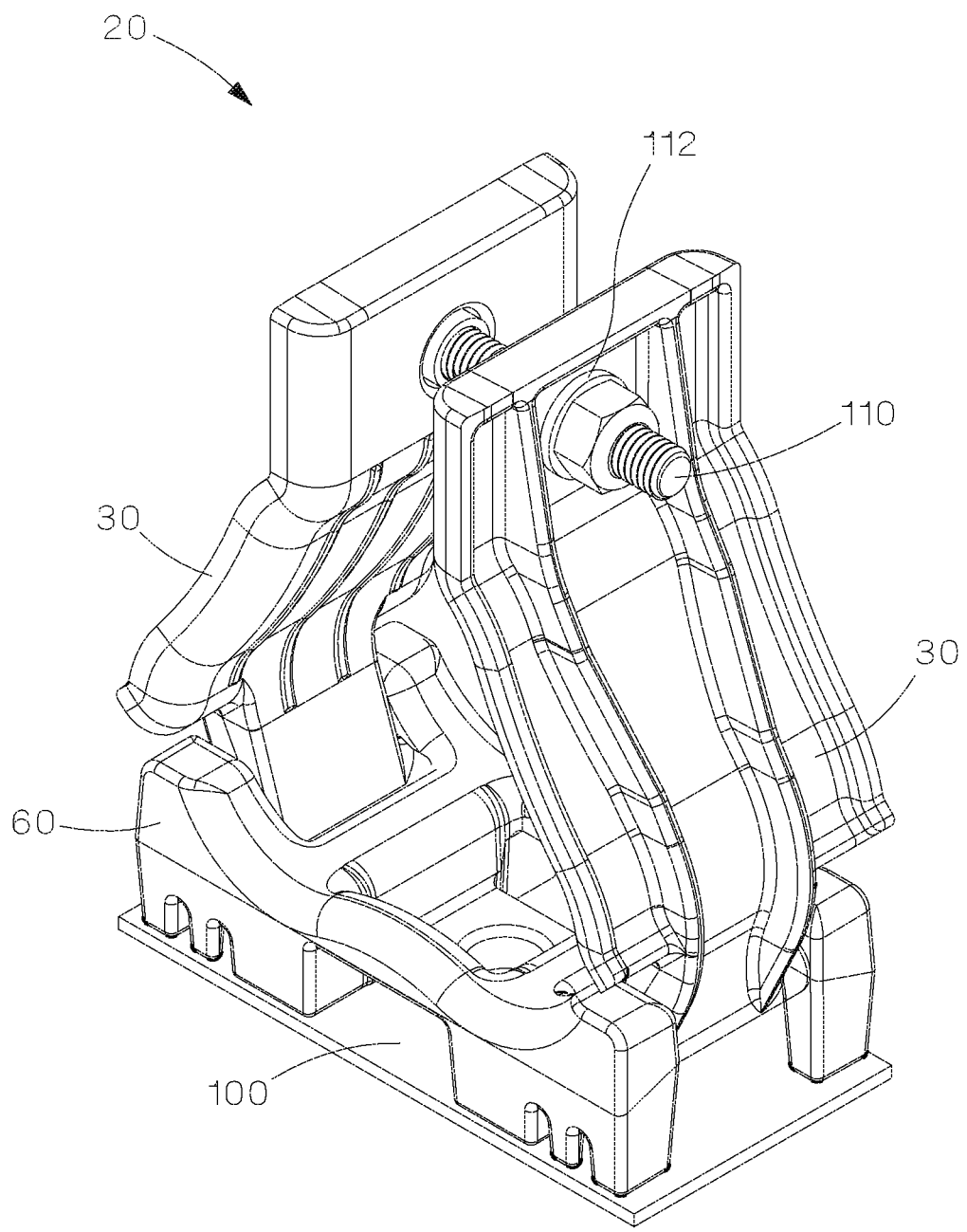
FIG. 1 is a perspective view of the cable cleat assembly of the present invention positioned on an insulating spacer.

FIG. 1 illustrates a perspective view of the cable cleat assembly 20 of the present invention. The cable cleat assembly 20 is a three-piece assembly held together in a triangular arrangement by a fastener 110, such as a clamping bolt. The cable cleat assembly 20 includes two side bodies 30 and a base 60.

Figure 2:
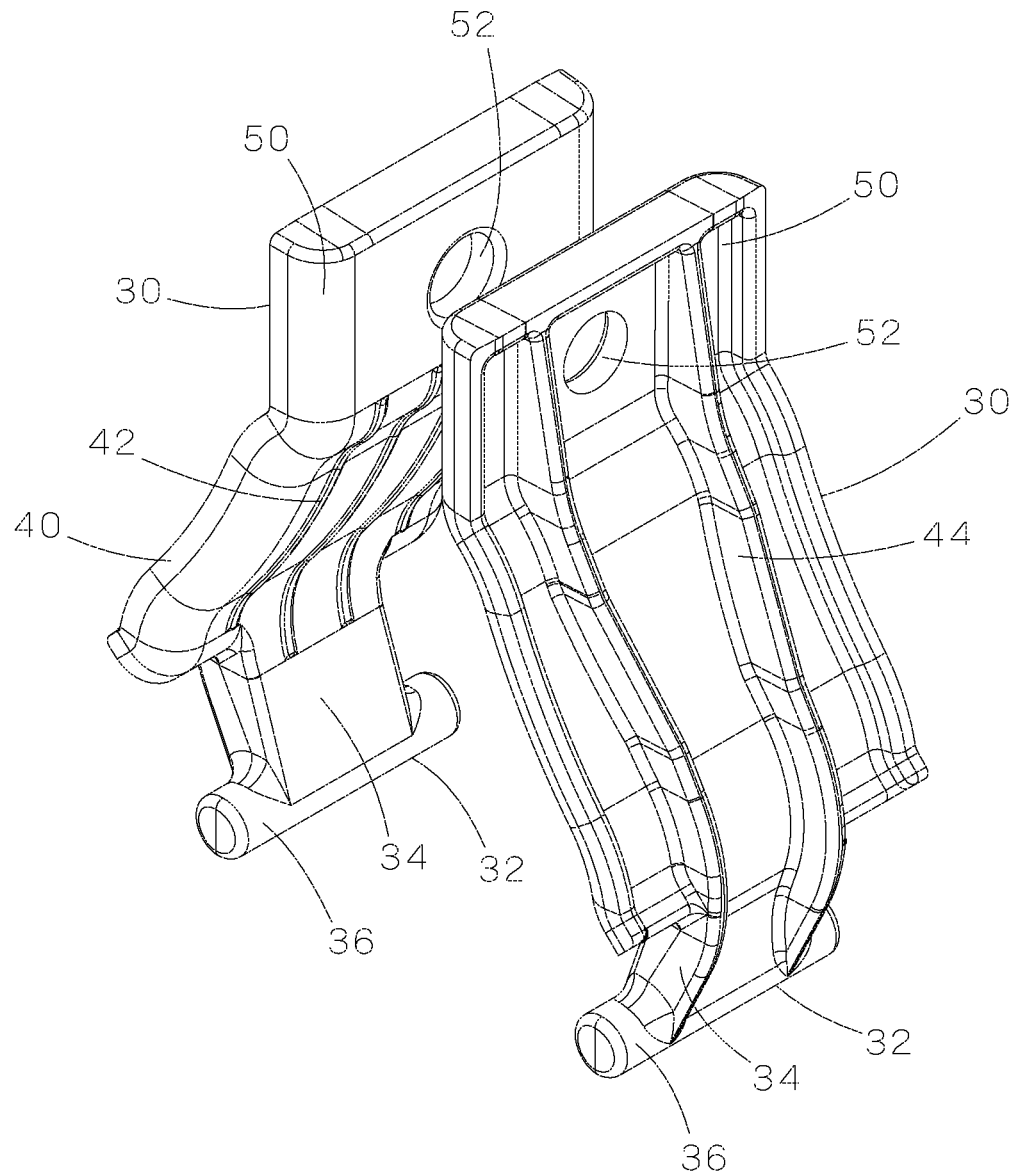
FIG. 2 is a perspective view of the side bodies of the cable cleat assembly of FIG. 1.

As illustrated in FIG. 2, each side body 30 includes a first end 32 including a mounting member. The mounting member is a narrow portion 34 with intrinsic pegs 36 extending outwardly therefrom. Each side body 30 includes a wider curved middle section 40 with securing ribs 42 located on the inner surfaces of the middle section 40. The securing ribs 42 hold the cables under axial loads when the cable cleat assembly 20 is installed. The side bodies 30 also include exterior flanges 44 extending from the outer surface of the middle section 40. The wider middle section 40 of the side bodies 30 leads to the second end 50. The second end 50 of each side body 30 is straight with a centered hole 52 for receiving a fastener 110, such as a clamping bolt.

Figure 3:
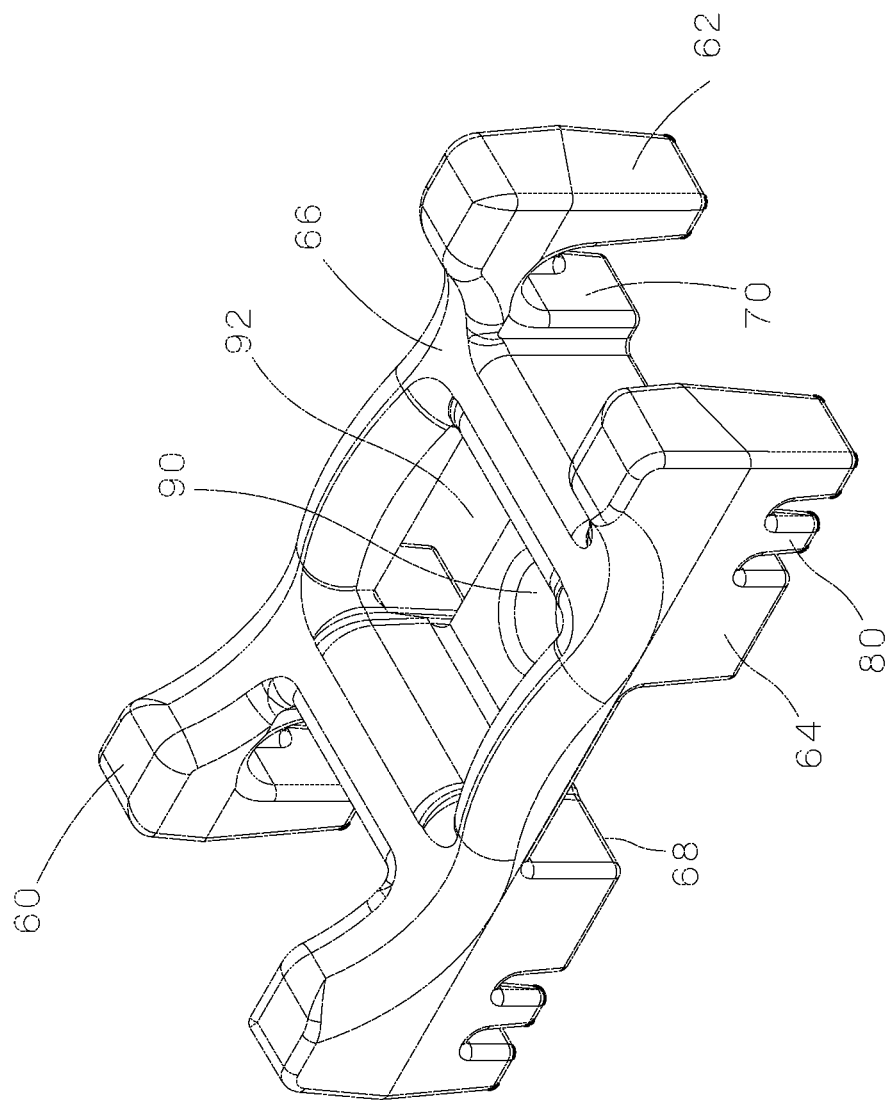
FIG. 3 is a perspective view of the base of the cable cleat assembly of FIG. 1.
Figure 4:
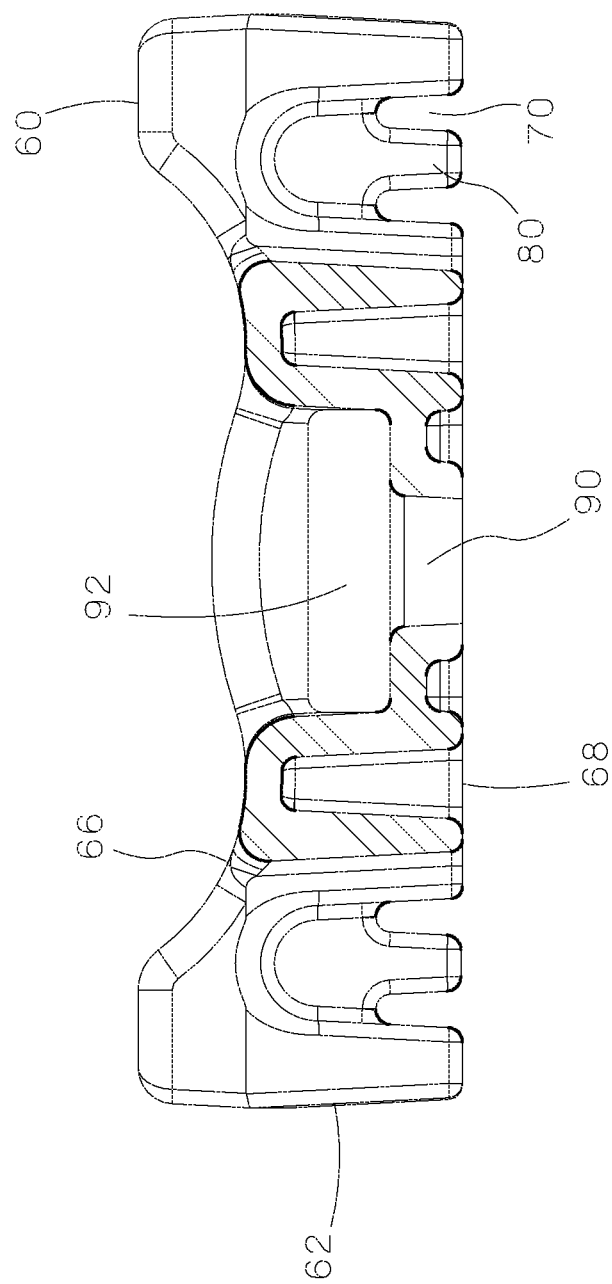
FIG. 4 is a front view of the base of FIG. 3.

FIGS. 3 and 4 illustrate the base 60 of the cable cleat assembly. The base 60 includes two open ends 62 with slots 70 that are accessible from the bottom 68 of the base 60. The sides 64 of the base 60 include a plurality of tabs 80 with each tab 80 positioned adjacent one of the slots 70.

Figure 5:
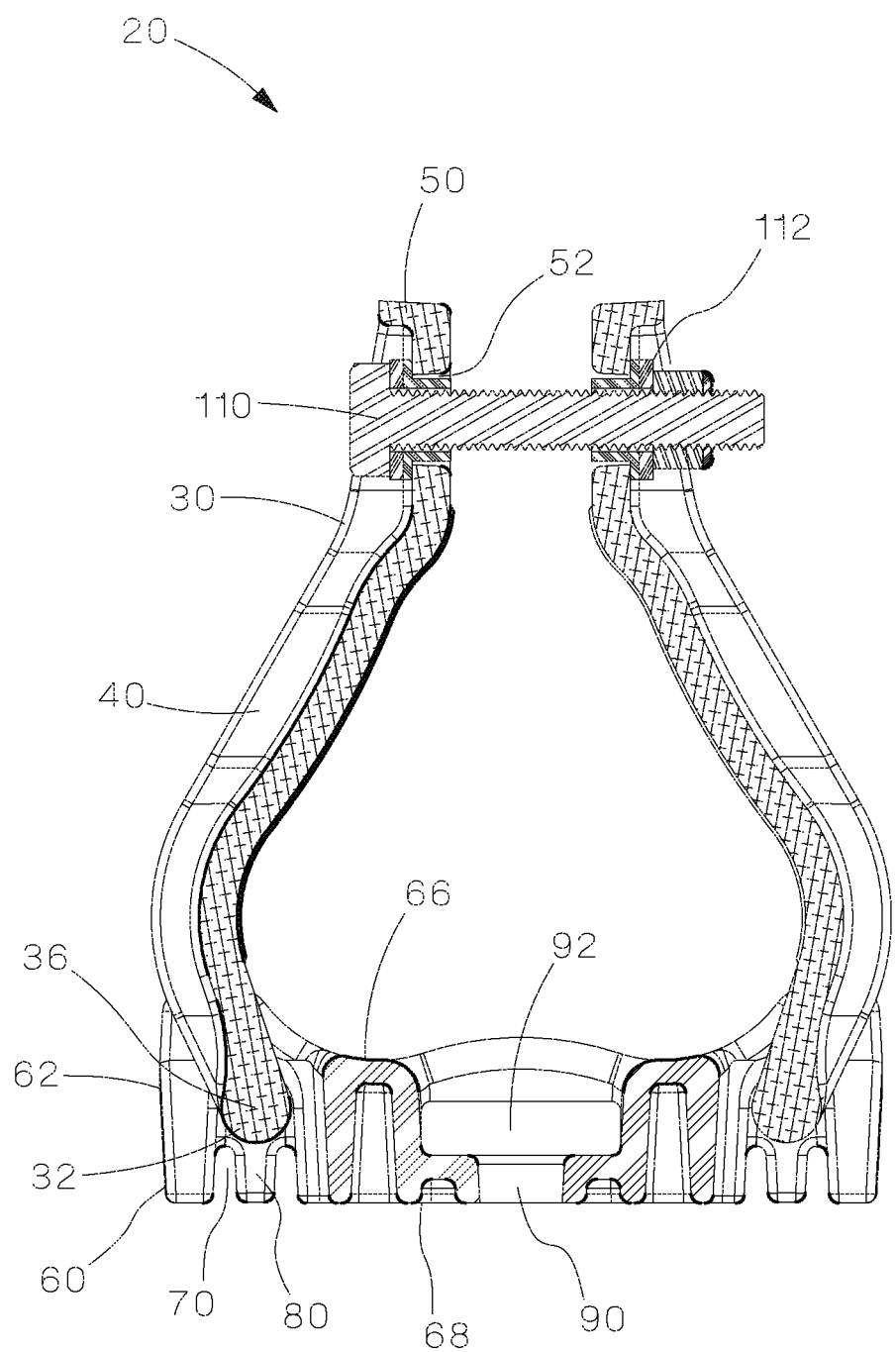
FIG. 5 is a front view of the cable cleat assembly of FIG. 1.

As illustrated in FIG. 5, the slots 70 in the base 60 are designed to mate with the intrinsic pegs 36 extending from the first end 32 of each side body 30. The intrinsic pegs 36 of each side body 30 slide into the slots 70 in the base 60 from the bottom 68 of the base 60.

Figure 6:
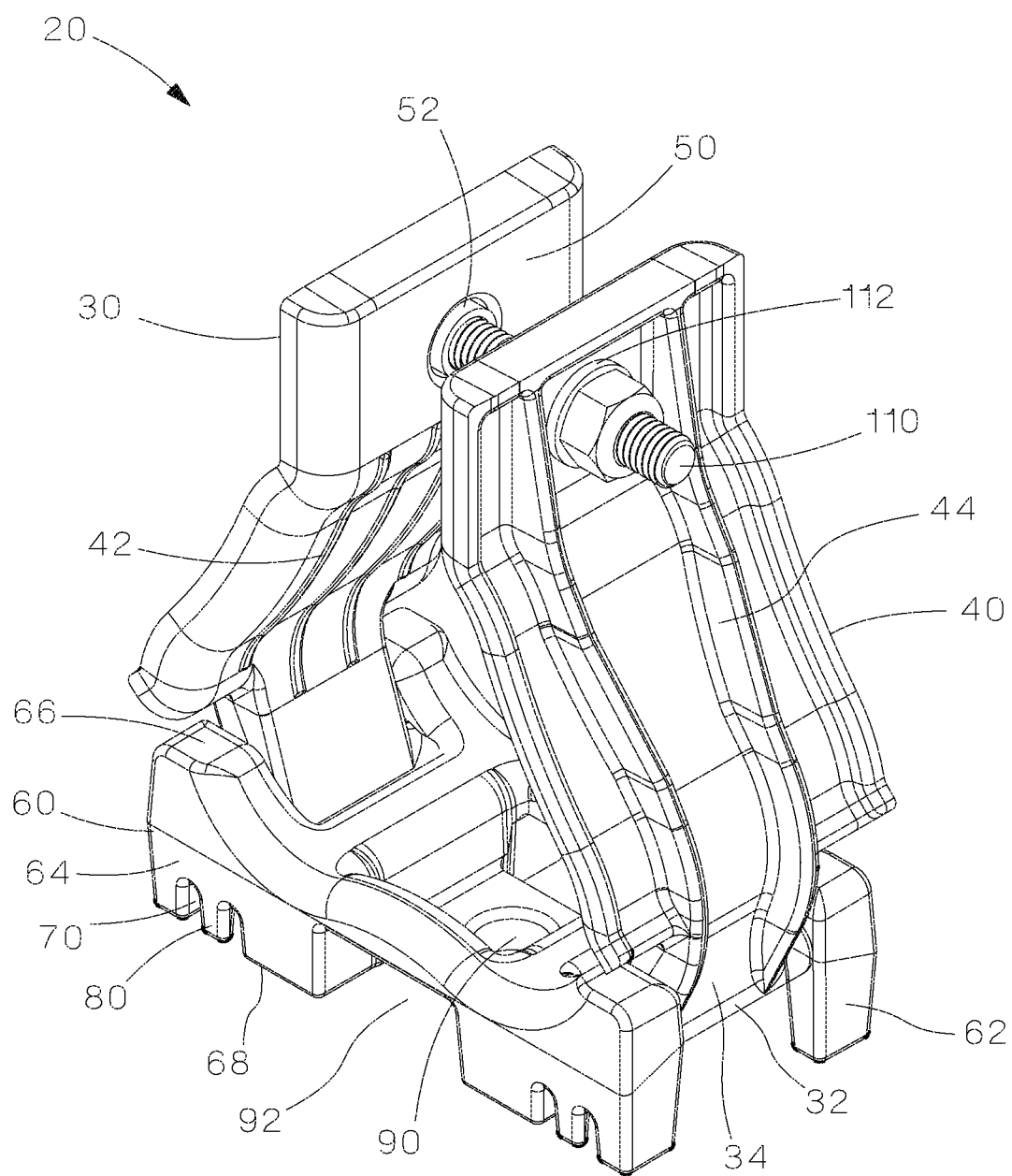
FIG. 6 is a perspective view of the cable cleat assembly of FIG. 1 with securing tabs.
Figure 7:
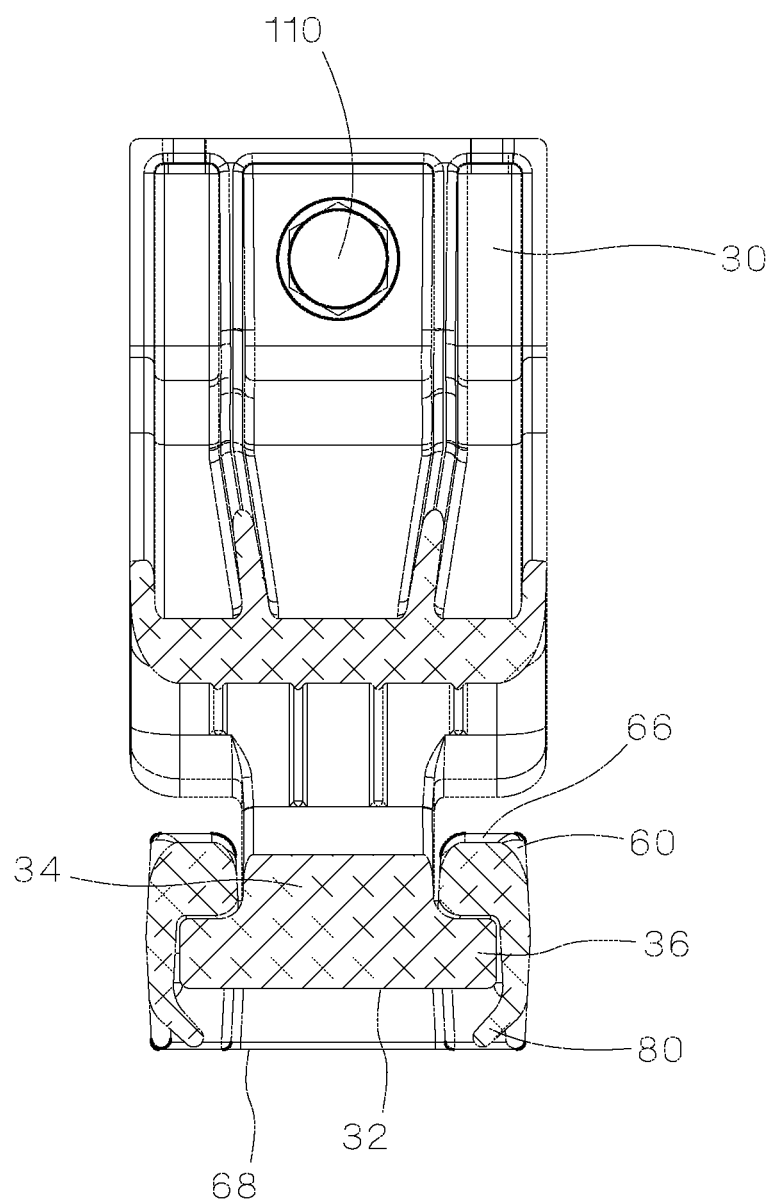
FIG. 7 is a sectional view of the cable cleat assembly of FIG. 1 with the securing tabs of the base bent into position.

As illustrated in FIGS. 6 and 7, the tabs 80 in the sides 64 of the base 60 are bent inward toward the center of the cable cleat to retain one of the intrinsic pegs 36 positioned in the slots 70 in the base 60. The bent tabs 80 hold the intrinsic pegs 36 in the slots 70 without additional fasteners.

The intrinsic pegs 36 act as a hinge enabling the side bodies 30 to rotate from an open position to a closed position around a plurality of cables. The double hinge feature allows the cable cleat assembly to accommodate a range of cable diameters. Once the side bodies 30 are pivoted to a closed position, the fastener 110 is positioned through the holes 52 in the second end 50 of each side body 30 to secure the cable cleat assembly.

The peg and slot design of the cable cleat assembly allows for simple manufacture with no side actions and minimal secondary processing thereby reducing production costs. Additionally, there is no need for a separate hinge, as with typical cable cleat designs thereby preventing issues with galvanic corrosion.

The base and side bodies of the cable cleat assembly are manufactured with a die-cast aluminum. However, the cable cleat assembly may also be manufactured from injection molded plastic or cast stainless steel.

The cable cleat assembly may include an insulating spacer 100 positioned between the cable cleat base and the ladder rack to prevent issues with galvanic corrosion. The cable cleat assembly may also include insulating washers 112 positioned in between the fasteners and the second end of the cable cleat.

FIGS. 8-11 illustrate the cable cleat assembly of the present invention securing cables to a ladder rack. The base 60 provides for both bolt and bracket securement methods to secure the cable cleat assembly to a ladder rack, or without securement as an intermediate cleat. As illustrated in FIGS. 3 and 4, the base 60 includes a top 66 with a hole 90 located at the center of the base. The hole 90 receives a fastener 130 to secure the base to a ladder rack 150 or tray (see FIGS. 8-9). The sides 64 of the base 60 include a bracket slot 92 located at the center of the base 60 between the tabs 80. The bracket slot 92 extends from one side 64 of the base 60 to the opposite side 64 of the base 60 over the hole 90. The bracket slot 92 is designed to receive a bracket 140 for mounting on a ladder rack 150 (see FIGS. 10-11). As illustrated in FIGS. 8-11, the cable cleat assembly is centered over the ladder rack with each securement method.

Figure 8:
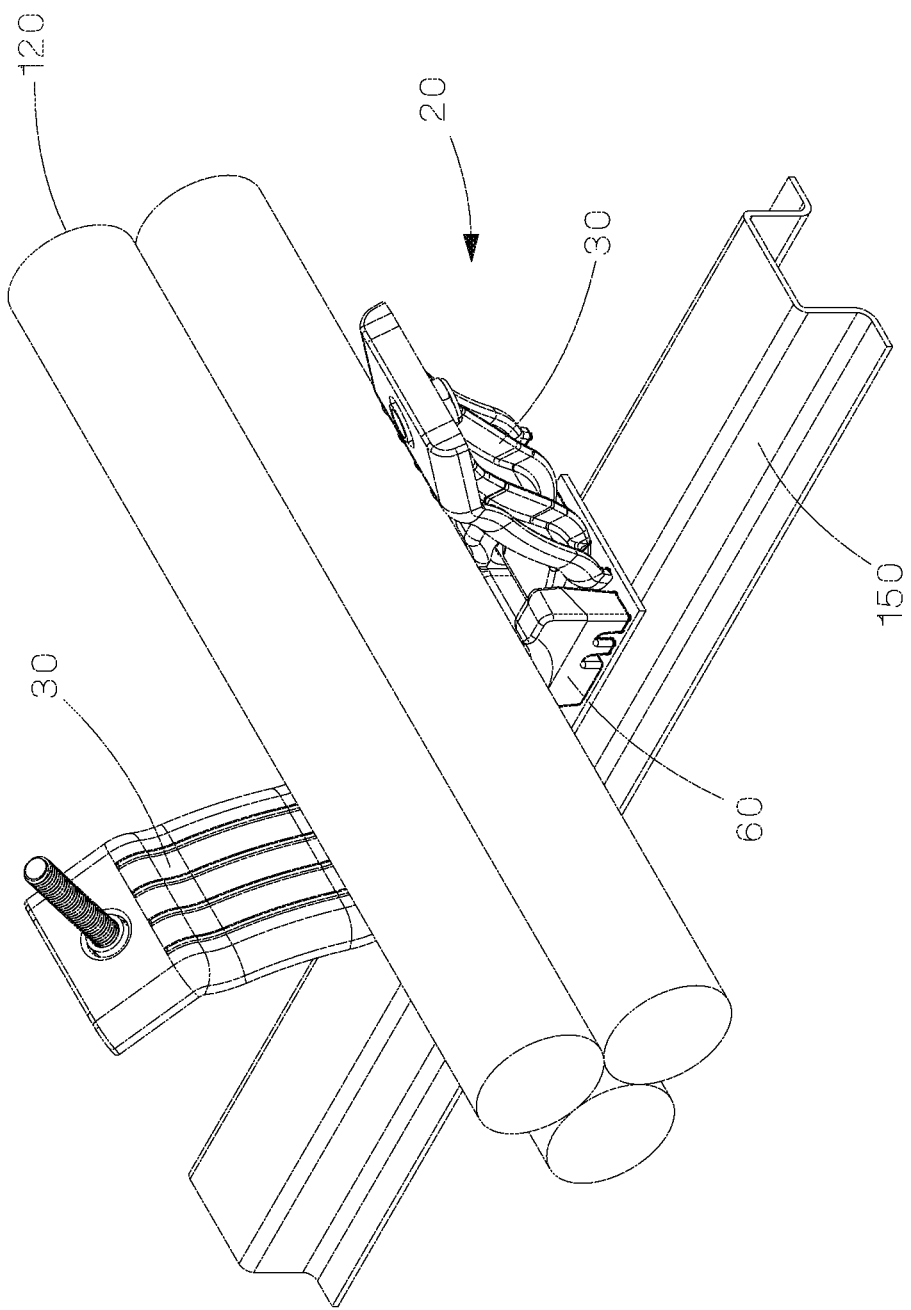
FIG. 8 is a perspective view of an open cable cleat assembly of FIG. 1 positioned on a ladder rack.
Figure 9:
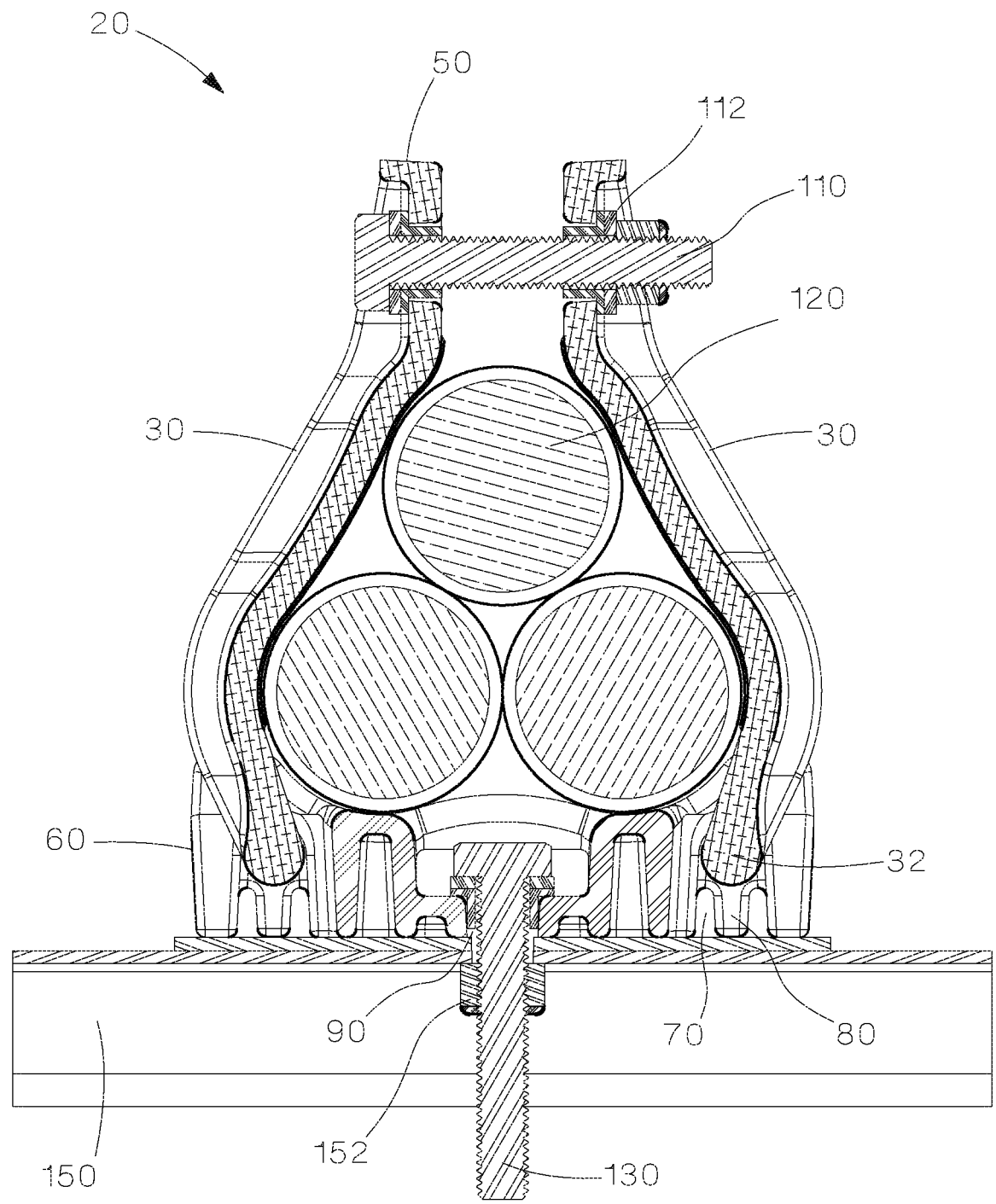
FIG. 9 is a sectional view of the cable cleat assembly of FIG. 1 installed around a trefoil cable arrangement and secured to a ladder rack by a fastener.

As illustrated in FIGS. 8-9, the cable cleat assembly 20 is installed directly on the ladder rack 150. The cable cleat assembly 20 is installed via a fastener 130, such as a mounting bolt. The cable cleat assembly 20 is installed onto the ladder rack 150 before the trefoil cables 120 can be placed on the base 60 of the cable cleat assembly 20 because access to the fastener 130 is required for typical installations in which the cables are positioned directly over fastener 130. Cables 120 are then individually placed in the cable cleat assembly 20, the side bodies 30 are pivoted to the closed positioned and fastened in place via fastener 110.

Figure 10:
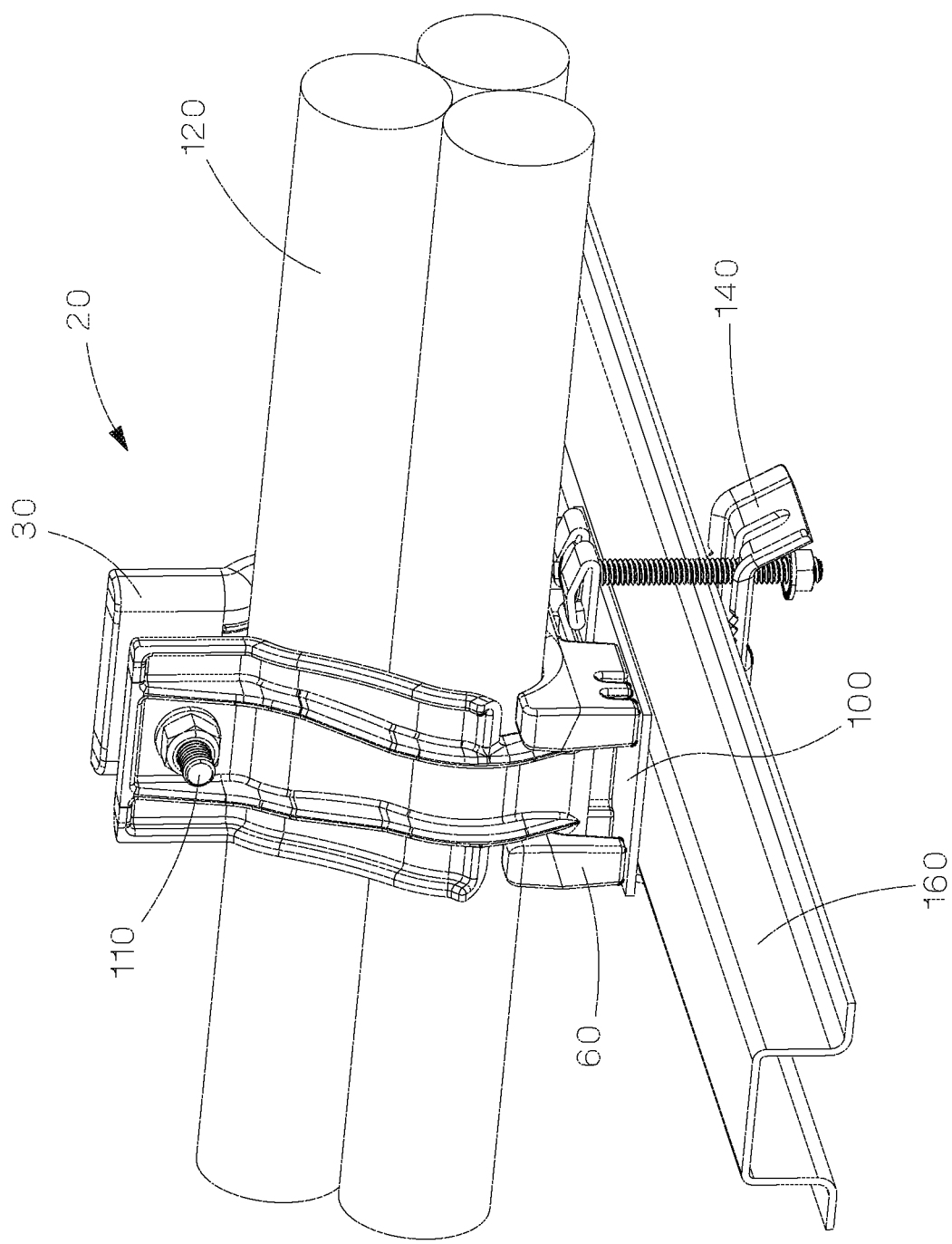
FIG. 10 is a perspective view of the cable cleat assembly of FIG. 1 secured to a ladder rack by a securing bracket.
Figure 11:
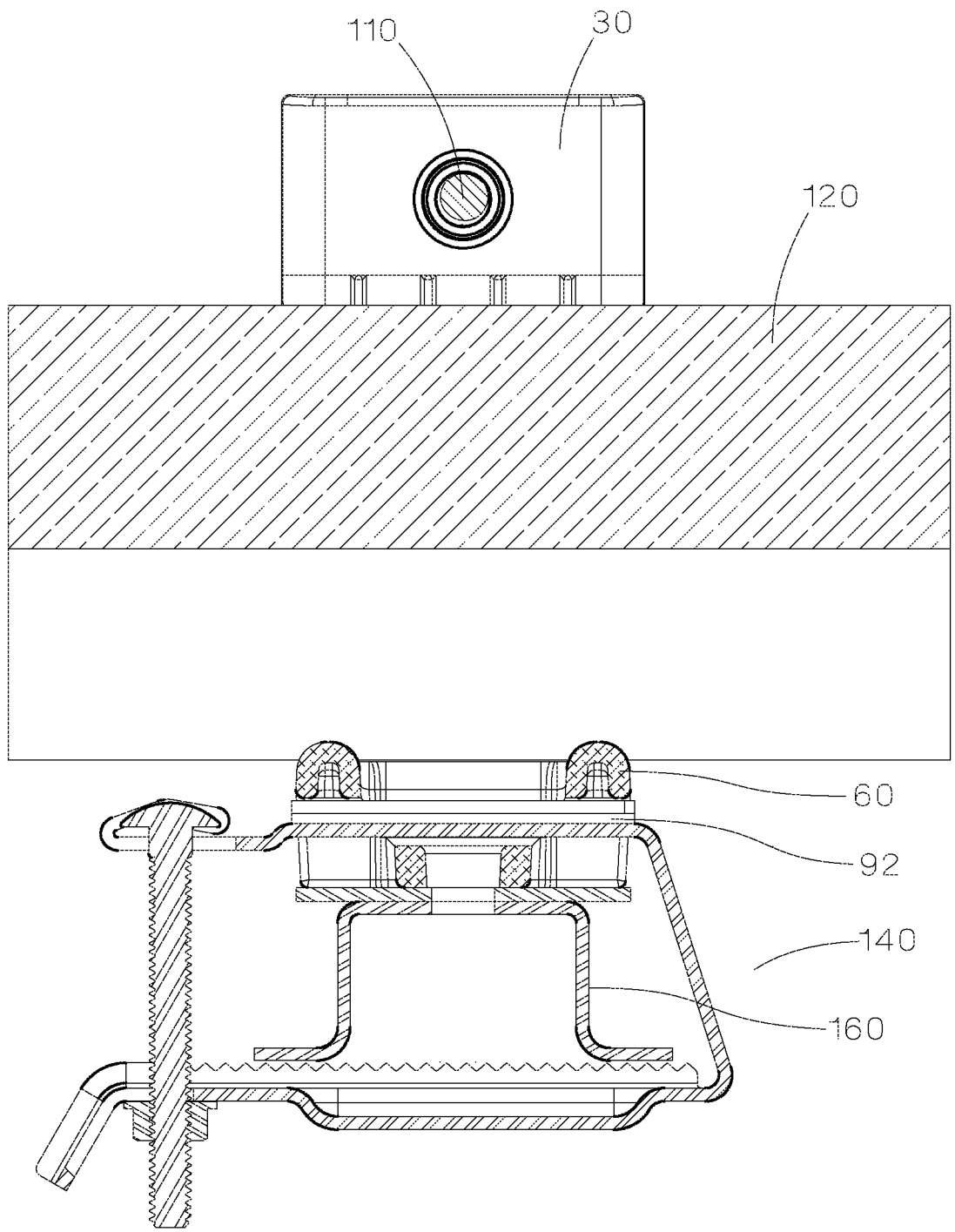
FIG. 11 is a sectional view of the cable cleat assembly of FIG. 10.
Figure 12:
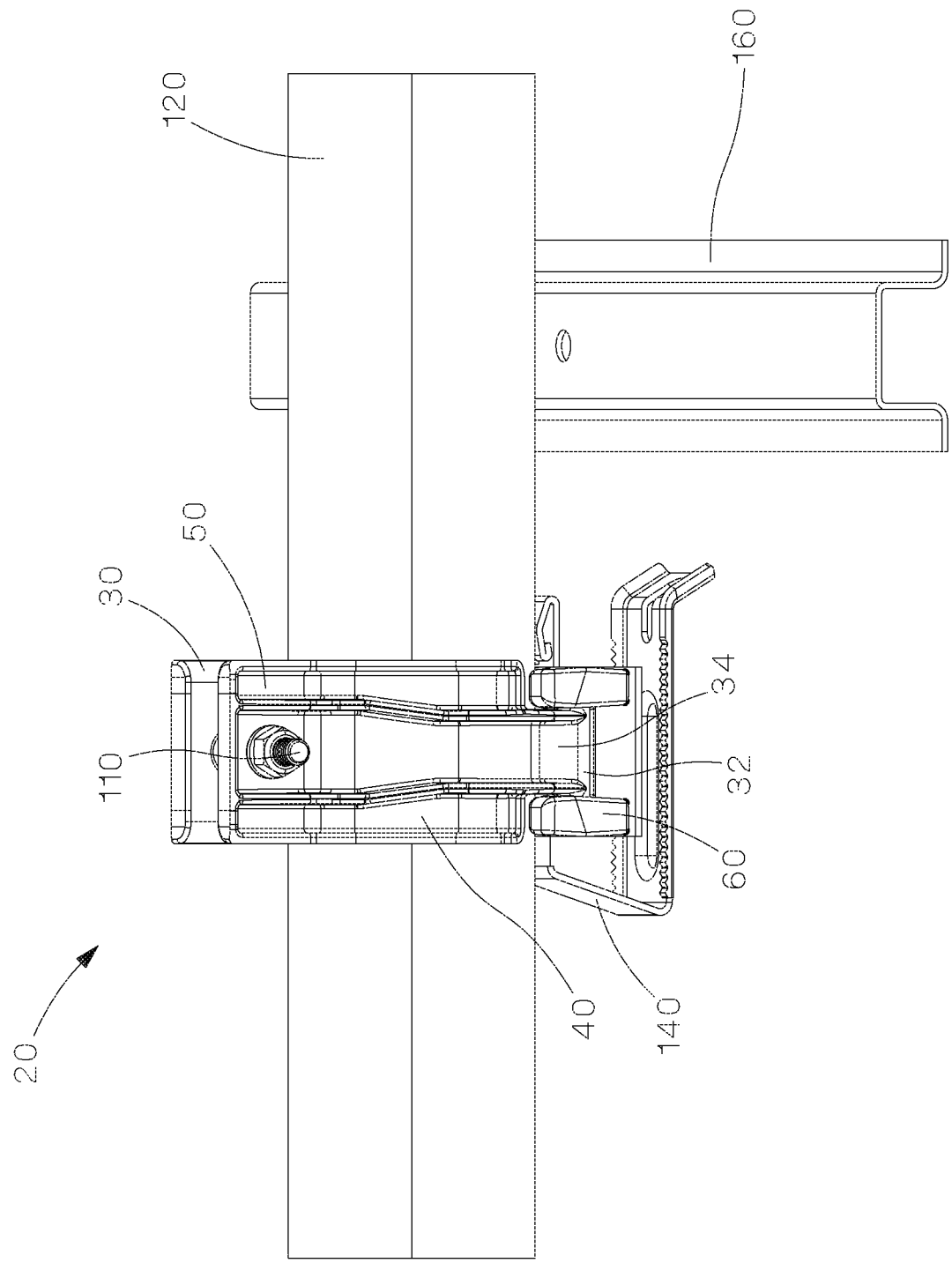
FIG. 12 is a perspective view of the cable cleat assembly of FIG. 10 secured to a bracket and positioned to be installed on a ladder rack.
Figure 13:
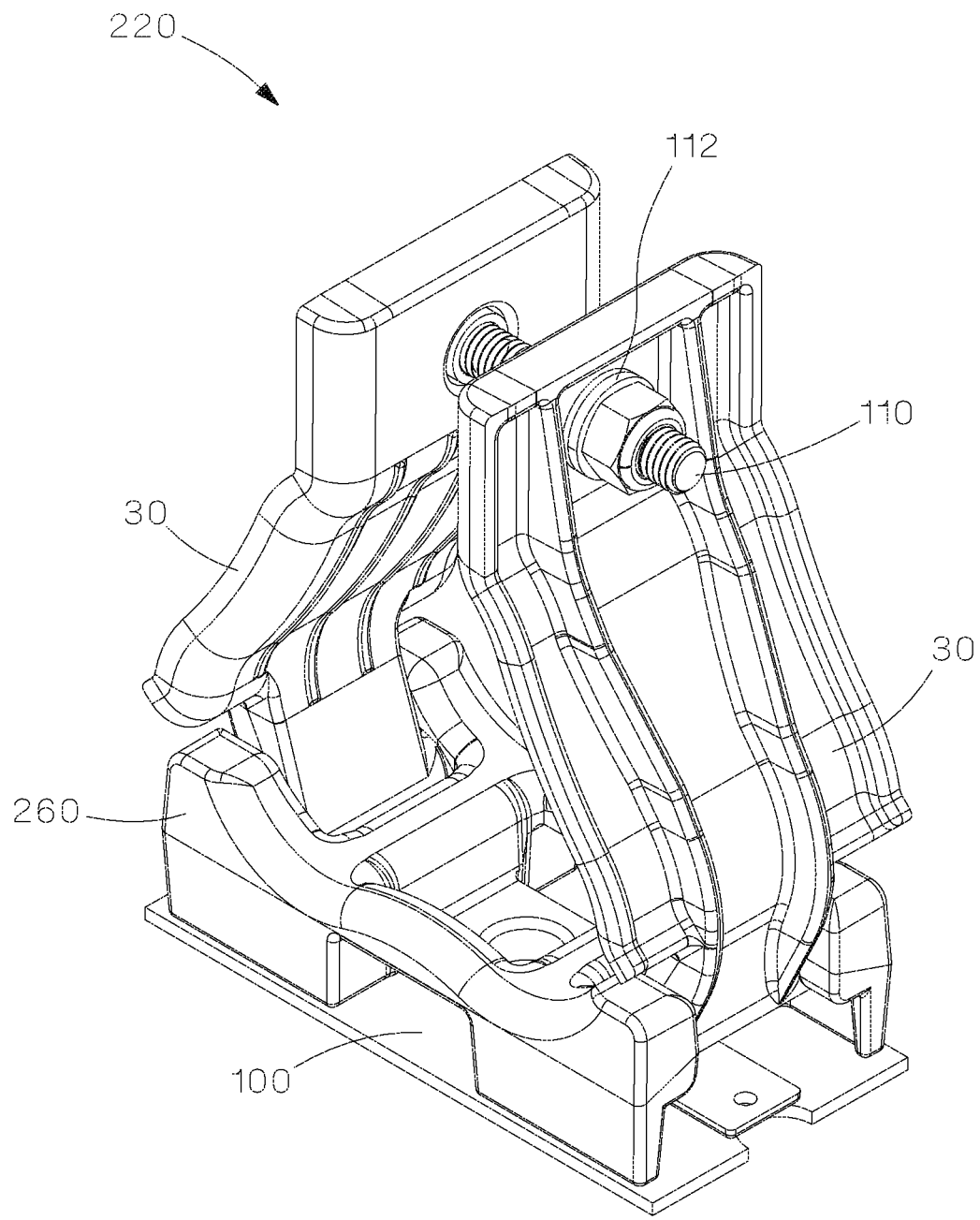
FIG. 13 is a perspective view of the cable cleat assembly with an alternative base positioned on an insulating spacer.

Alternatively, as illustrated in FIGS. 10-12, when there are no holes in the ladder rack 160, the cable cleat assembly 20 may be secured to the ladder rack 160 via bracket 140 that wraps around the ladder rack 160. When the cable cleat assembly 20 is attached via a bracket 140, the cable cleat assembly 20 may be assembled around existing trefoil cables 120 and then slid into place around the ladder rack 160 (see FIG. 12).

FIGS. 13-22 illustrate a cable cleat assembly 220. The cable cleat assembly 220 includes two side bodies 30 (see FIG. 2) and a base 260. The cable cleat assembly 220 is held together by a fastener 110, such as a clamping bolt.

Figure 14:
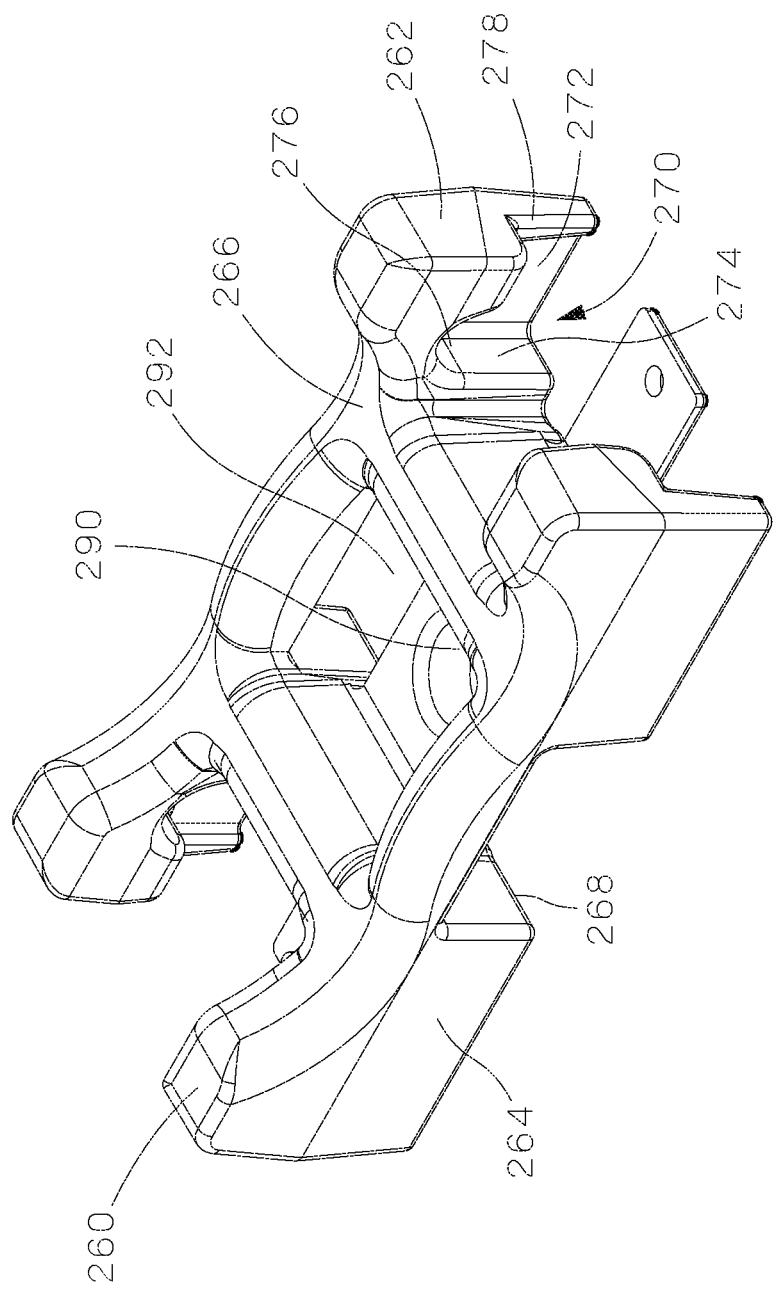
FIG. 14 is a perspective view of the base of the cable cleat assembly of FIG. 13.
Figure 15:
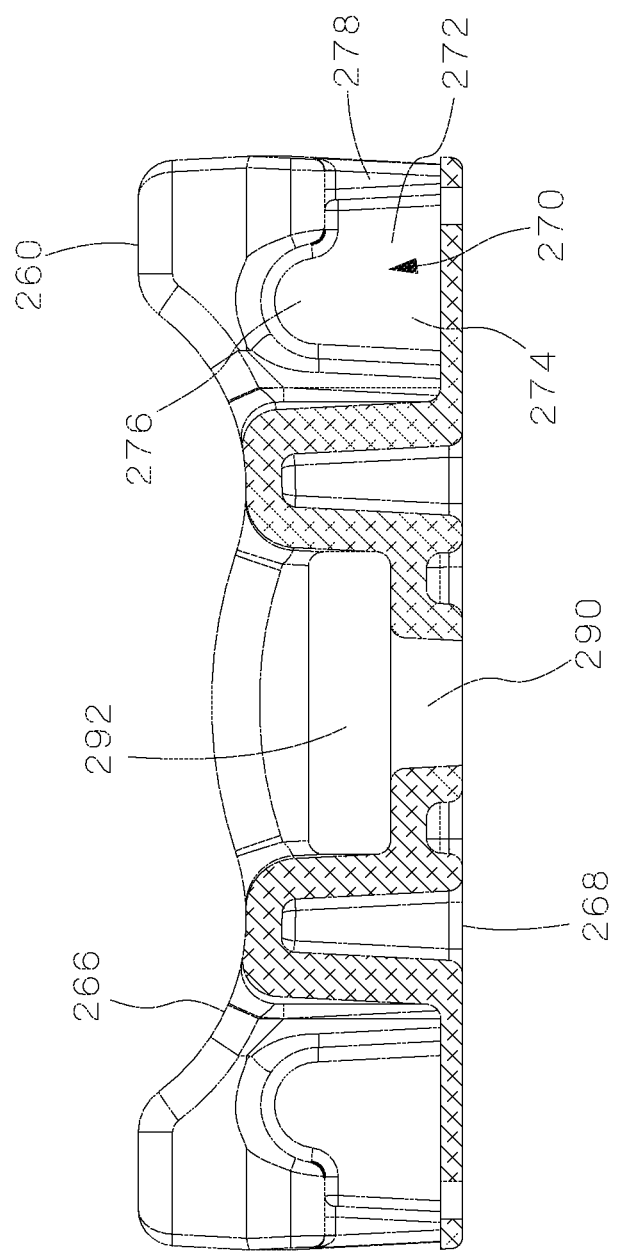
FIG. 15 is a sectional view of the base of FIG. 14.

The side bodies 30 in cable cleat assembly 220 are illustrated and described above with respect to FIG. 2. As illustrated in FIGS. 14-15, the base 260 includes two open ends 262, sides 264, a top 266, and a bottom 268. The open ends 262 provide access to slots 270. The slots 270 are defined by a horizontal portion 272, a vertical portion 274, and a semi-circular top portion 276. Tabs 278 are positioned at the open ends 262 to reduce access to the horizontal portion 272 of the slot.

Figure 16:
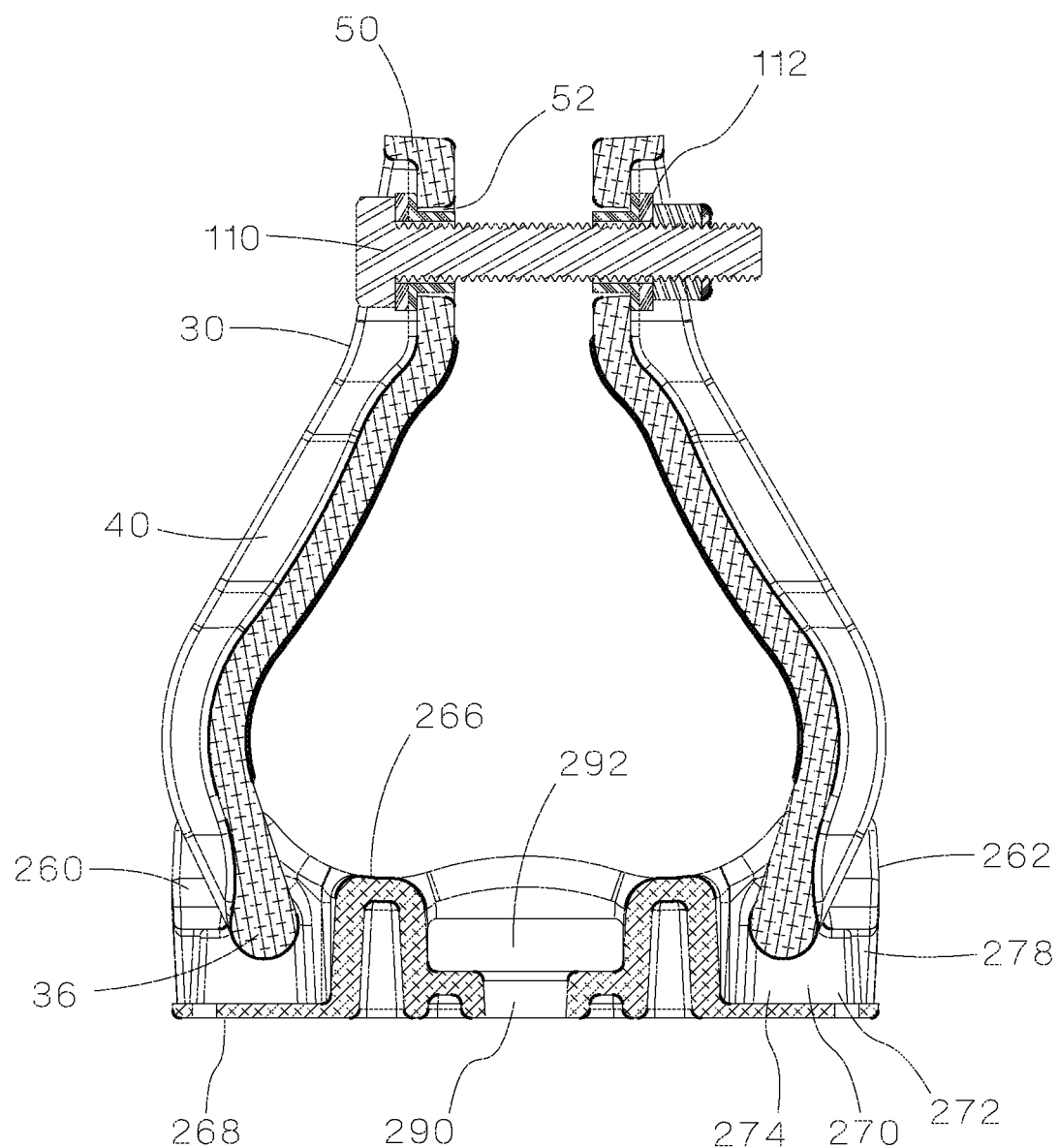
FIG. 16 is a sectional view of the cable cleat assembly of FIG. 13.

One of the side bodies 30 is press fit into one of the slots 270 in the base 260. The tabs 278 enable the side bodies 30 to be press fit into the base 260 and maintain the side bodies 30 in the slots 270 without additional fasteners. As illustrated in FIG. 16, the intrinsic pegs 36 that extend from the first end 32 of each side body 30 are positioned in the semi-circular top portion 276 of the slots 270.

The cable cleat assembly 220 may also include an insulating spacer 100 positioned between the cable cleat base and the ladder rack to prevent issues with galvanic corrosion. The cable cleat assembly may also include insulating washers 112 positioned in between the fasteners and the second end of the cable cleat.

Figure 17:
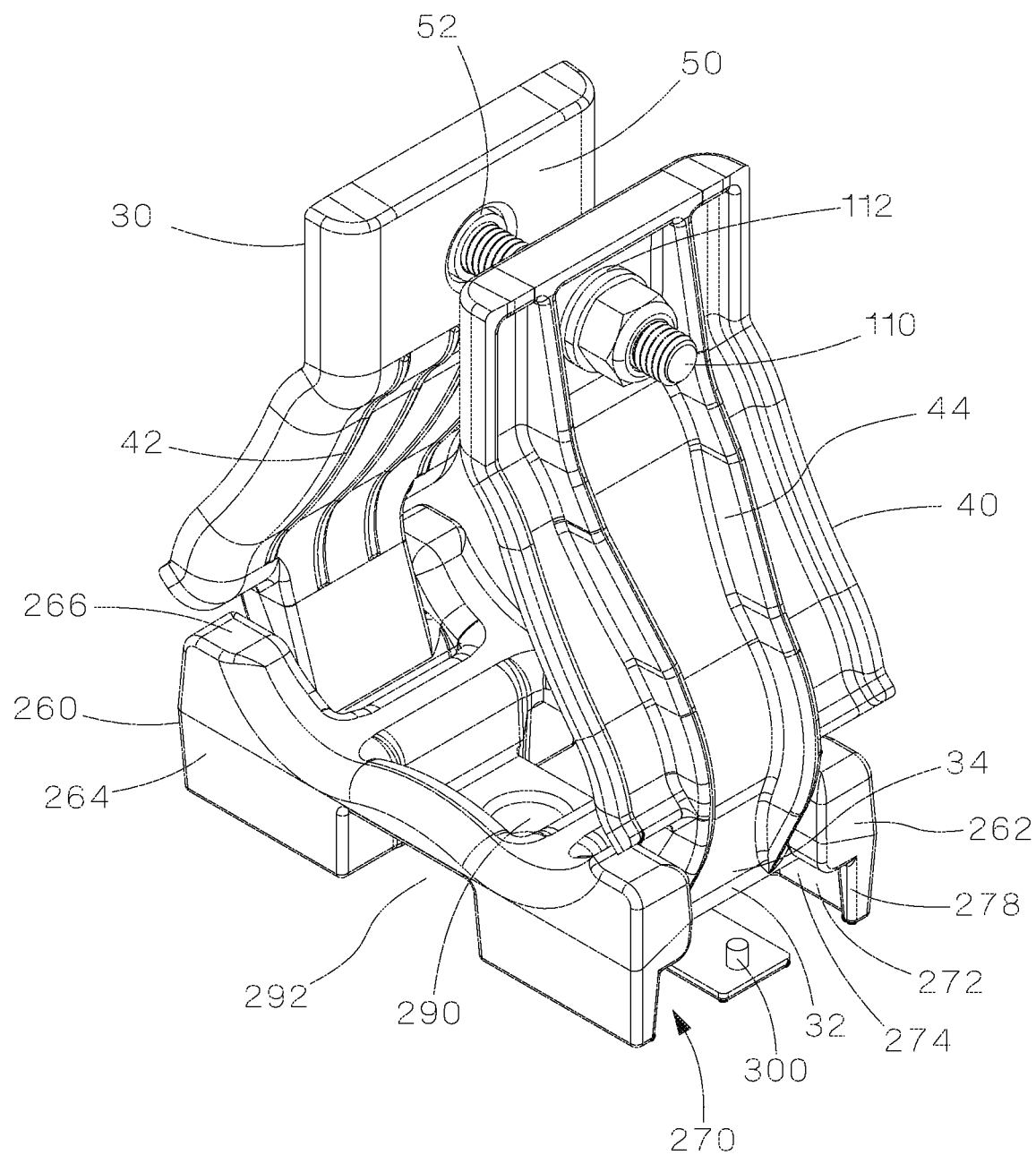
FIG. 17 is a perspective view of the cable cleat assembly of FIG. 13 with a blind rivet assembly.
Figure 18:
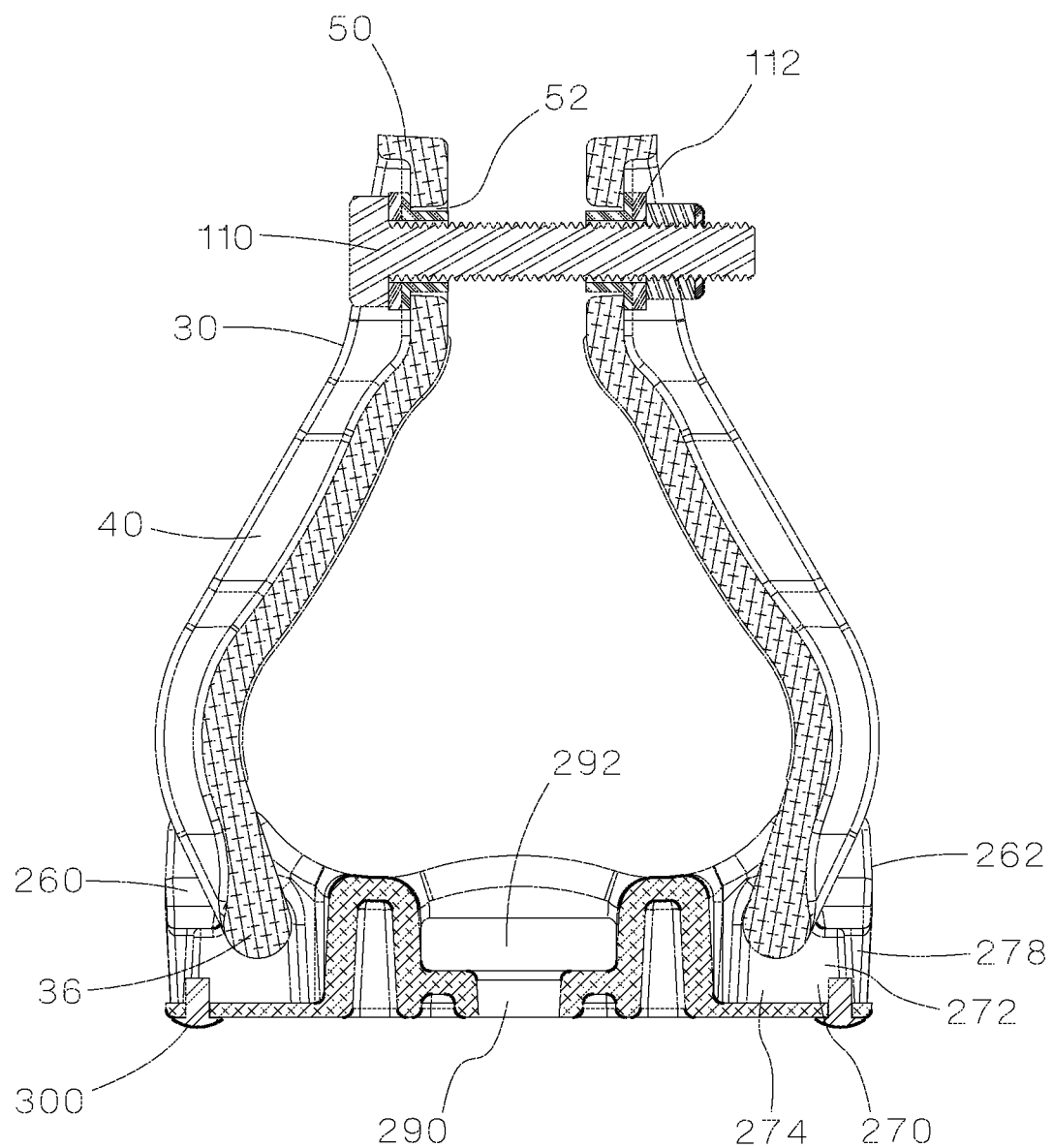
FIG. 18 is a sectional view of the cable cleat assembly of FIG. 17.
Figure 19:
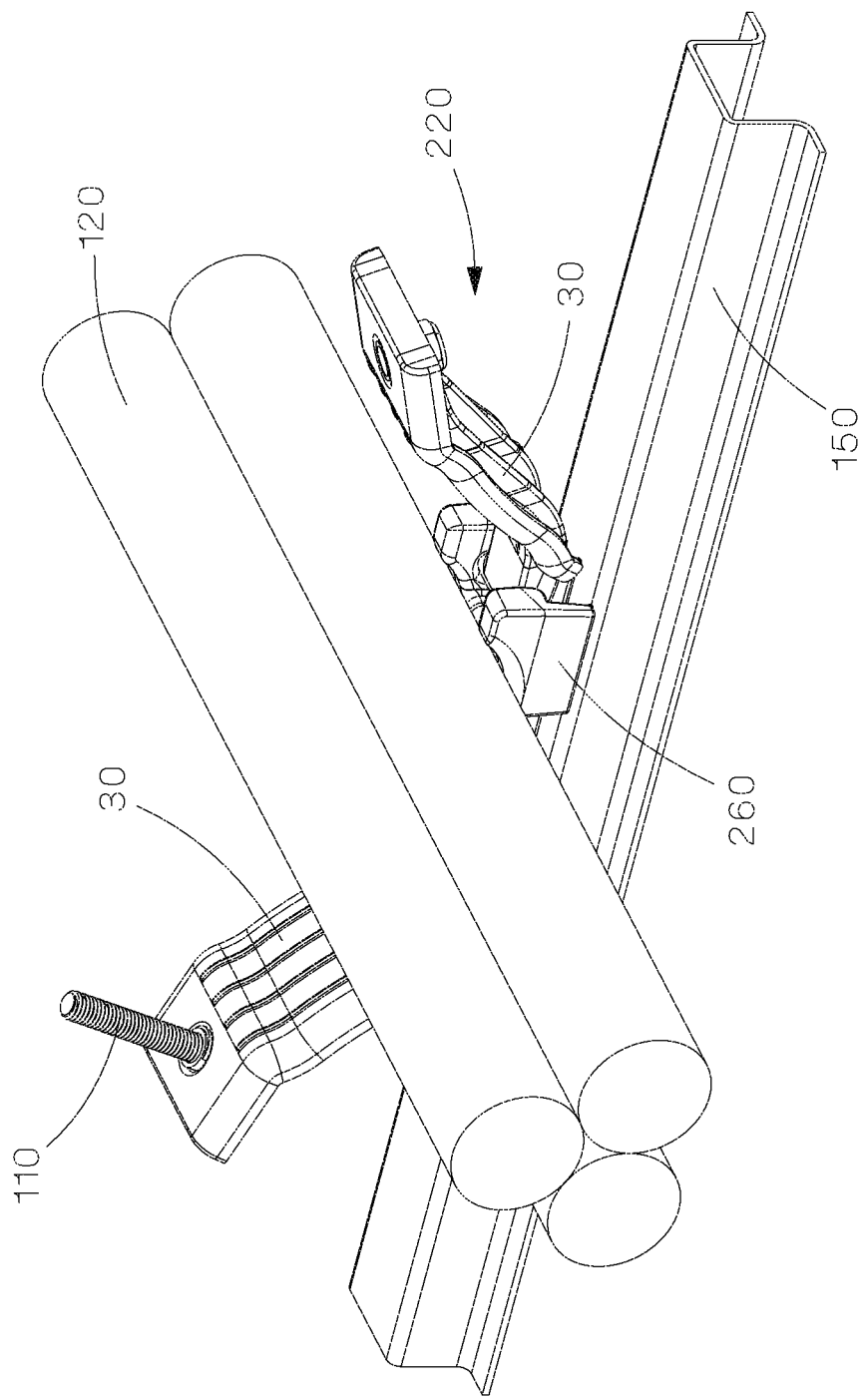
FIG. 19 is a perspective view of an open cable cleat assembly of FIG. 13 positioned on a ladder rack.
Figure 20:
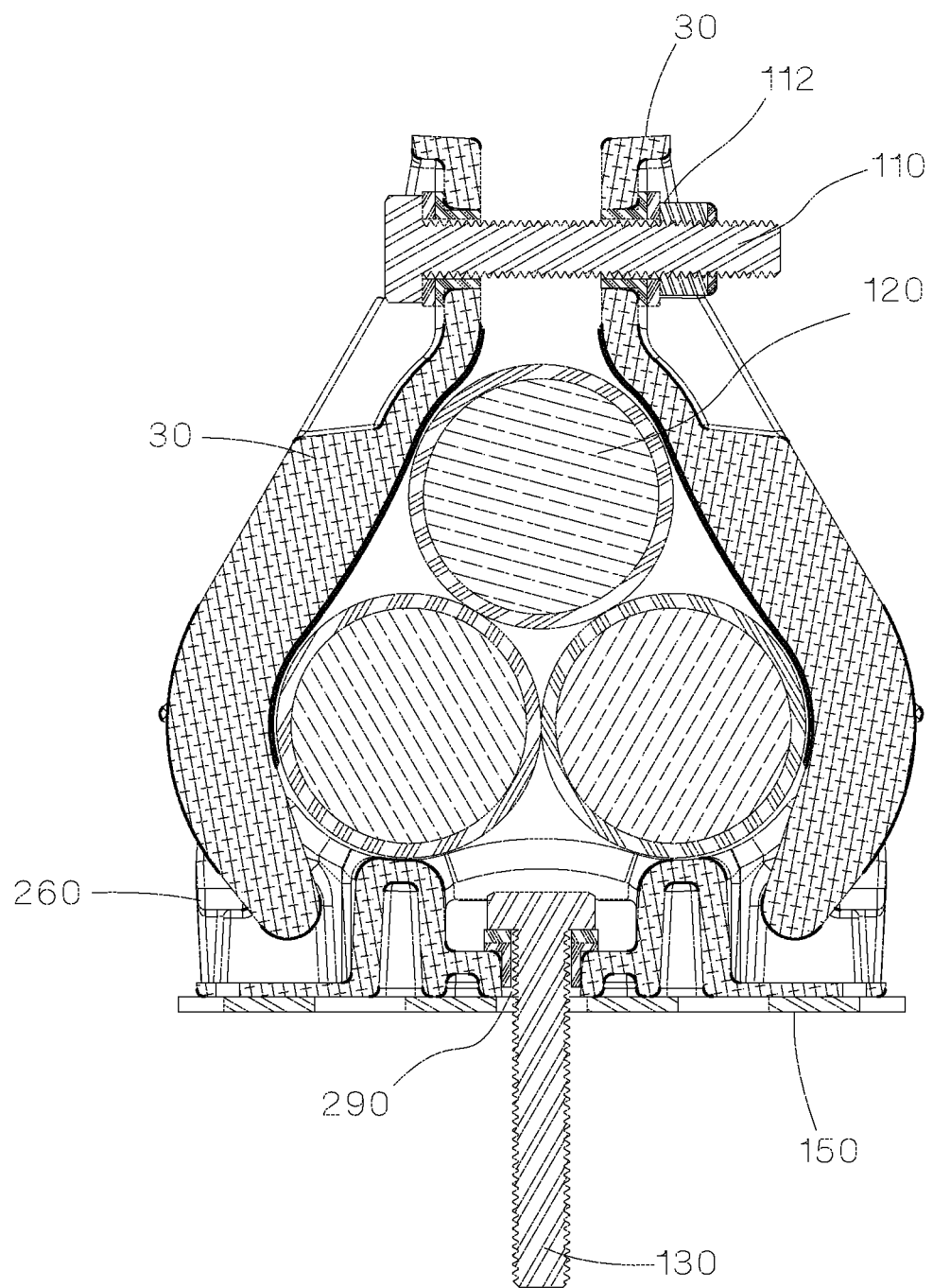
FIG. 20 is a sectional view of the cable cleat assembly of FIG. 13 installed around a trefoil cable arrangement and secured to a ladder rack by a fastener.
Figure 21:
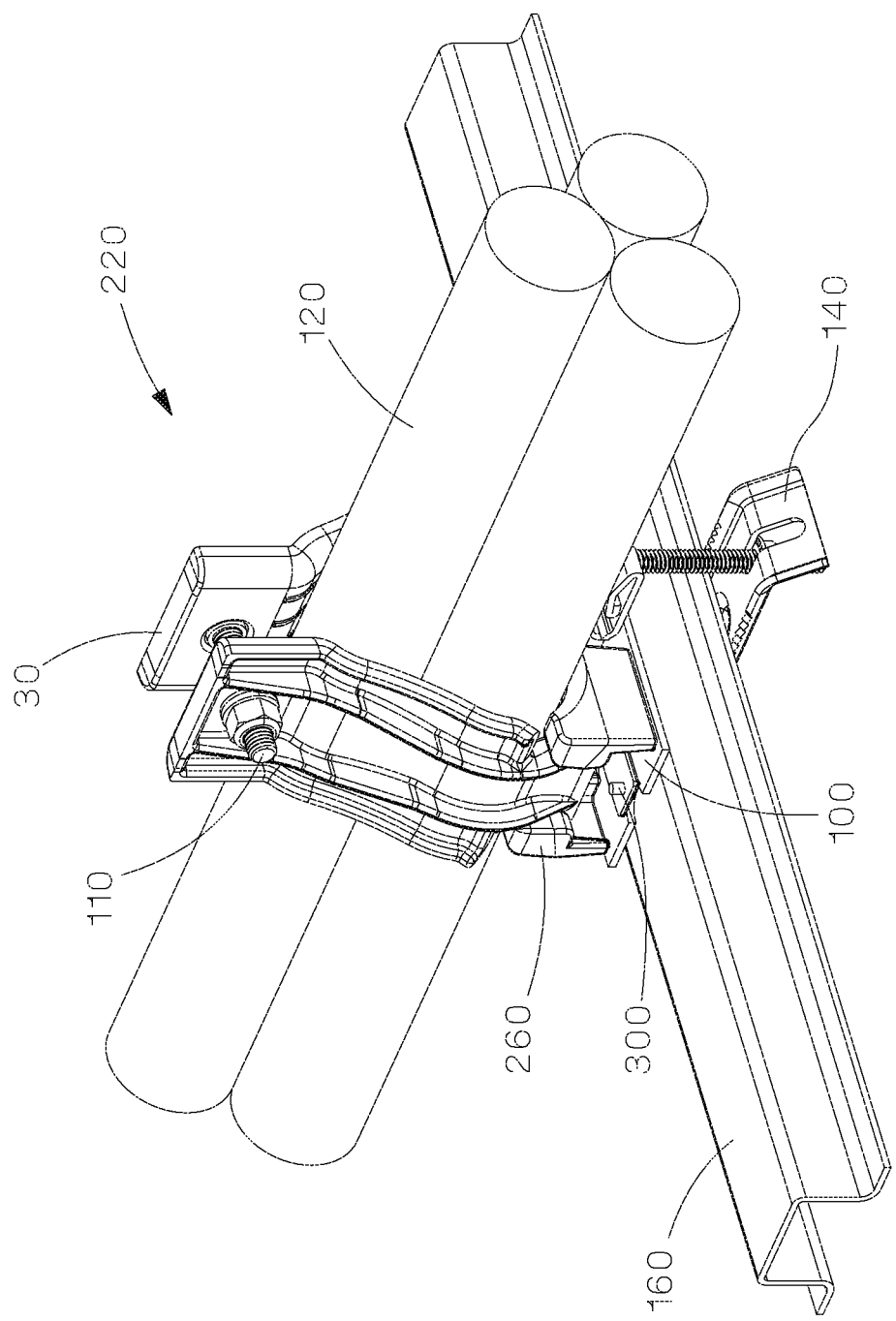
FIG. 21 is a perspective view of the cable cleat assembly of FIG. 13 secured to a ladder rack by a securing bracket.
Figure 22:
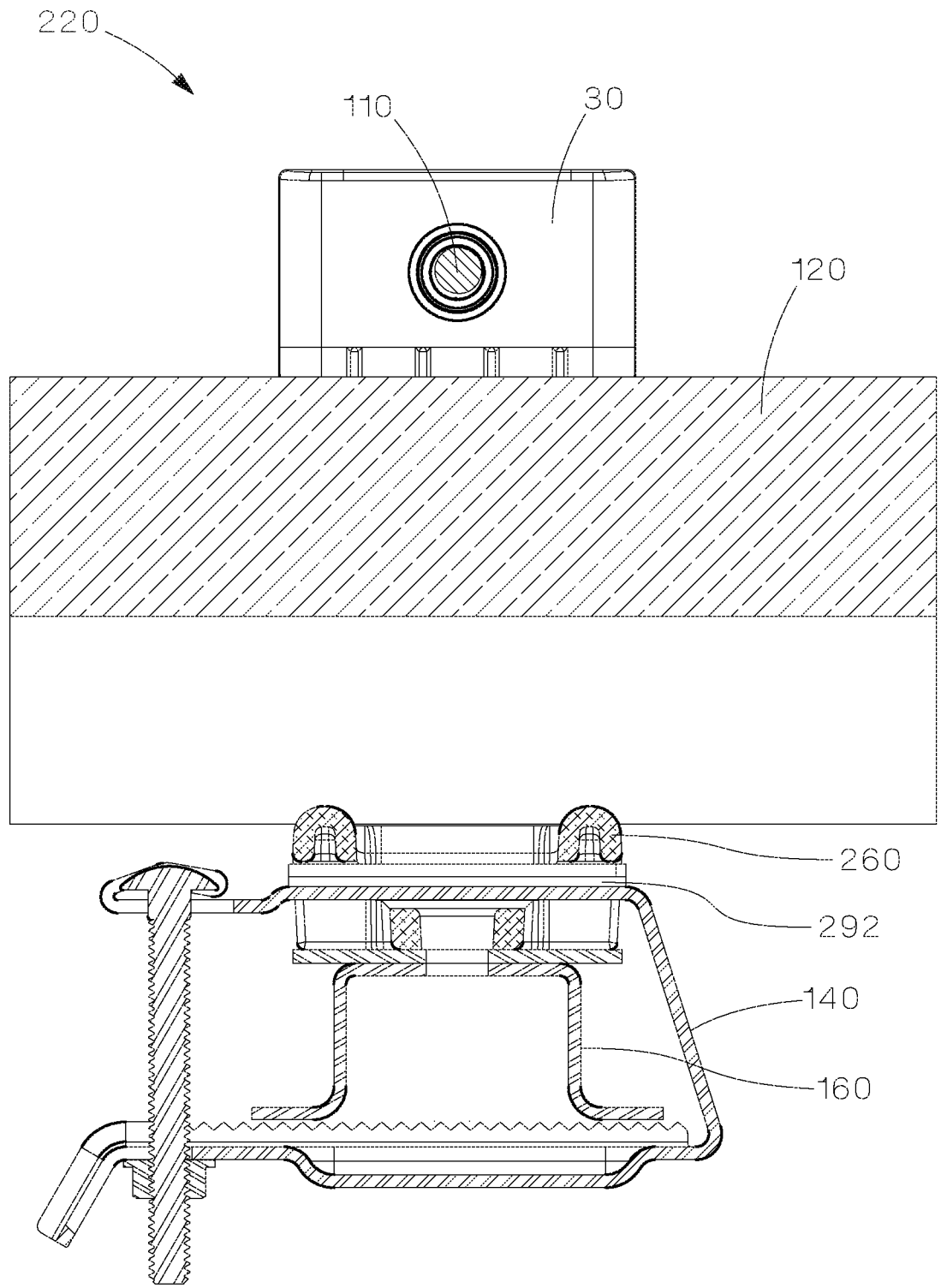
FIG. 22 is a sectional view of the cable cleat assembly of FIG. 21.
Figure 23:
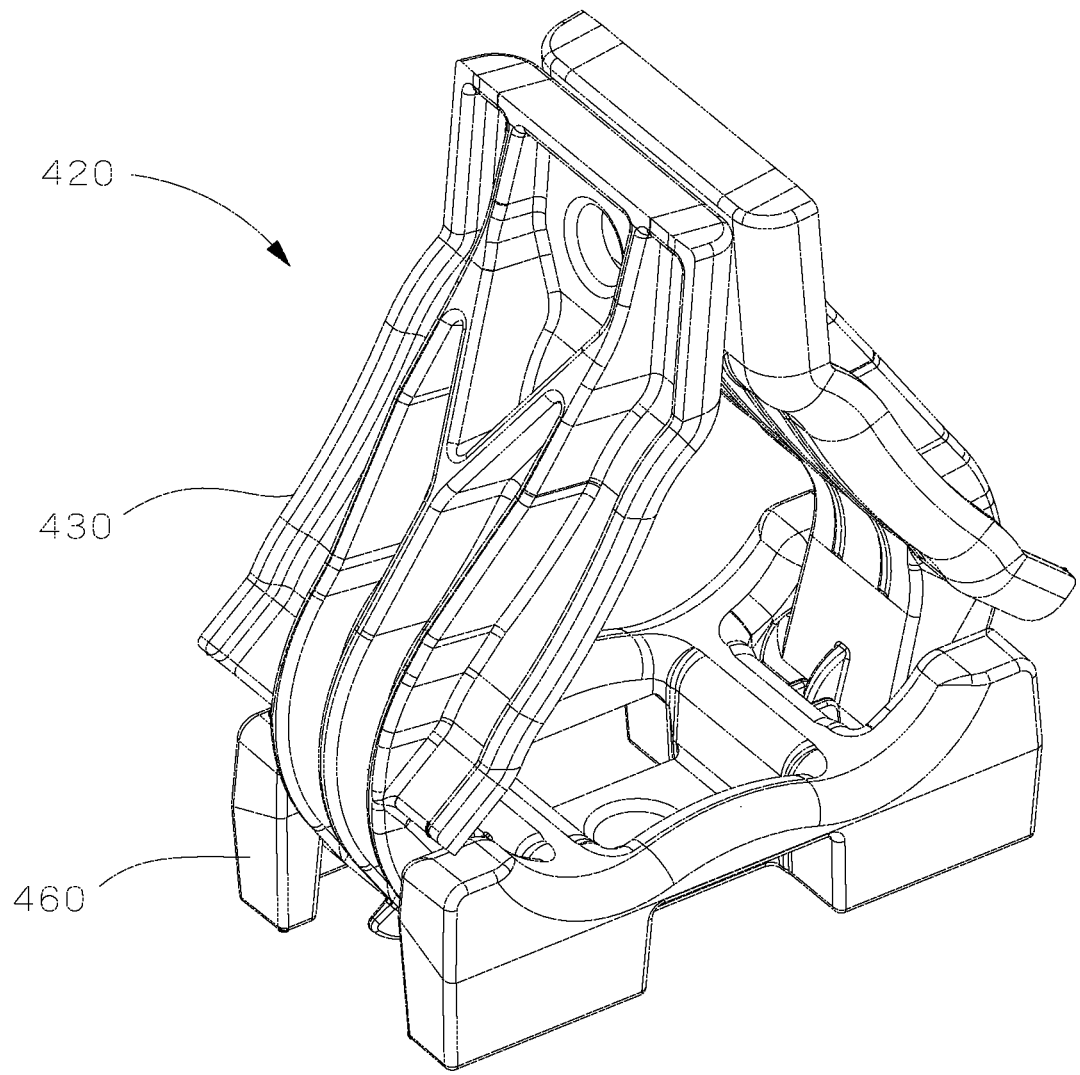
FIG. 23 is a perspective view of an alternative cable cleat assembly.

FIGS. 17 and 18 illustrate the cable cleat assembly 220 with blind rivets 300. The blind rivets 300 may be used, if desired, to assist with the press fit of the side bodies 30 by containing the side bodies 30 within the base 260 while being installed.

As discussed above, the intrinsic pegs 36 act as a hinge enabling the side bodies 30 to rotate from an open position to a closed position around a plurality of cables 120. The double hinge features allows the cable cleat assembly 220 to accommodate a range of cable diameters. Once the side bodies 30 are pivoted to a closed position, a fastener 110 is installed through the holes 52 in the second end 50 of each side body 30 to secure the cable cleat assembly 220.

FIGS. 19-22 illustrate the cable cleat assembly 220 securing cables 120 to a ladder rack 150, 160. The base 260 provides for both bolt and bracket securement methods to secure the cable cleat assembly 220 to a ladder rack 150, 160.

As illustrated in FIGS. 14-15, the base 260 includes a hole 290 located at the center of the base 260. A fastener 130 is received in the hole 290 to secure the base 260 to a ladder rack 150 (see FIGS. 19-20).

Also illustrated in FIGS. 14-15, the base 260 includes a bracket slot 292 that extends from one side 264 of the base 260 to the opposite side 264 of the base 260. The bracket slot 292 is designed to receive a bracket 140 for mounting on a ladder rack 160 (see FIGS. 21-22).

FIGS. 23-29 illustrate an alternative embodiment for a cable cleat assembly 420. The cable cleat assembly 420 includes a base 460 and two identical side bodies 430 that would be secured to each other by a fastener, as described above. The alternative embodiment cable cleat assembly 420 also includes features that aid in the assembly of the side bodies 430 to the base 460. As a result, the side bodies 430 are secured to the base 460 without the use of tools.

Figure 24:
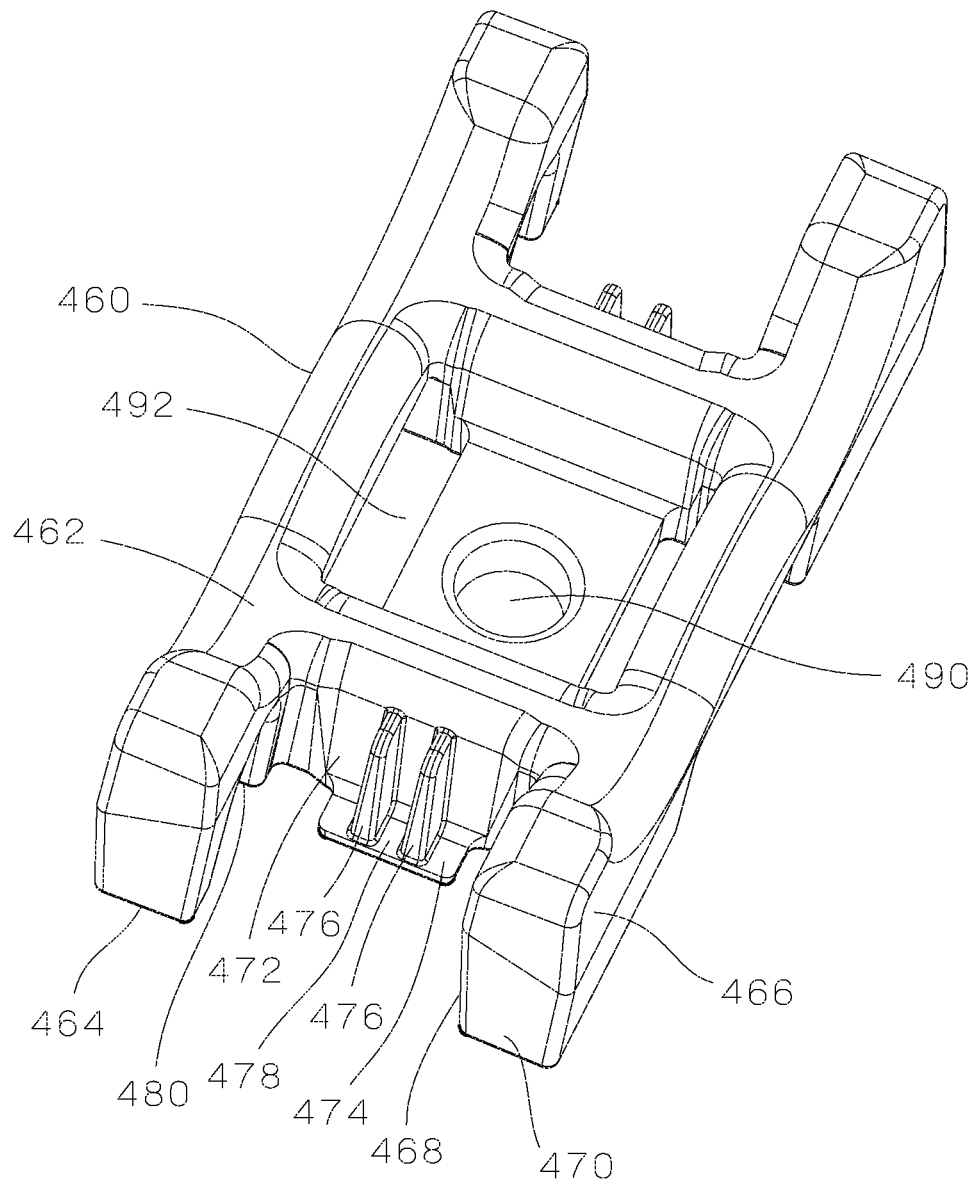
FIG. 24 is a perspective view of the base of FIG. 23.

As illustrated in FIG. 24, the base 460 includes a top 462, a bottom 464, sides 466, and two ends 468. Each end 468 is defined by two outer end members 470 and an inner end member 472 positioned between the outer end members 470. Slots 480 are also formed in the base 460. The slots 480 are accessible from the bottom 464 of the base 460 (see FIG. 26). The slots 480 are hidden by the outer end members 470 and the sides 466 of the base 460. A retaining tab 474 with two parallel alignment ribs 476 extends from each inner end member 472 of the base 460 into an open area of the base 460. The retaining tab 474 and alignment ribs 476 are centered between the sides 466 of the base 460. The alignment ribs define an opening or slot therebetween.

Figure 25:
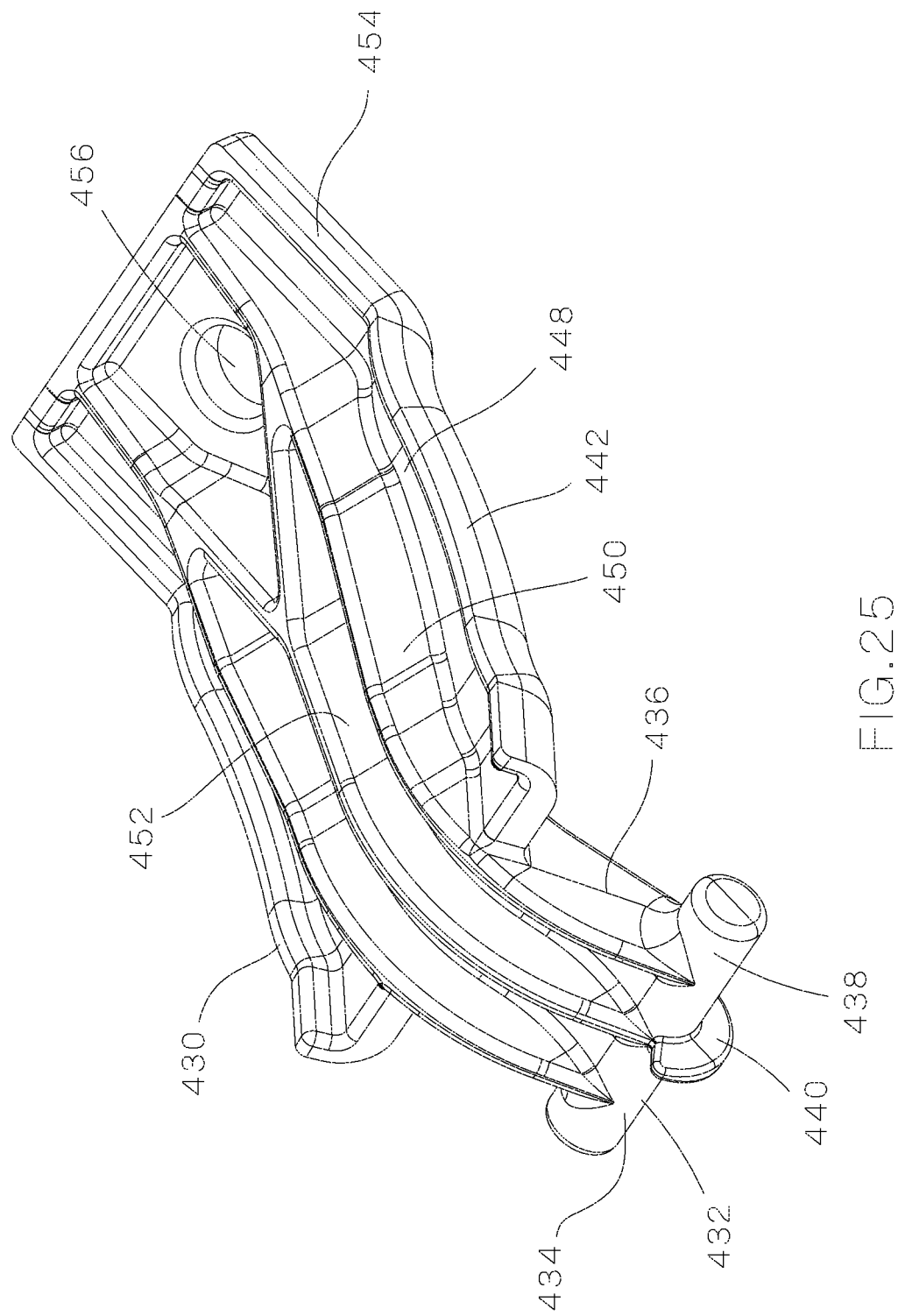
FIG. 25 is a perspective view of the side body of FIG. 23.
Figure 26:
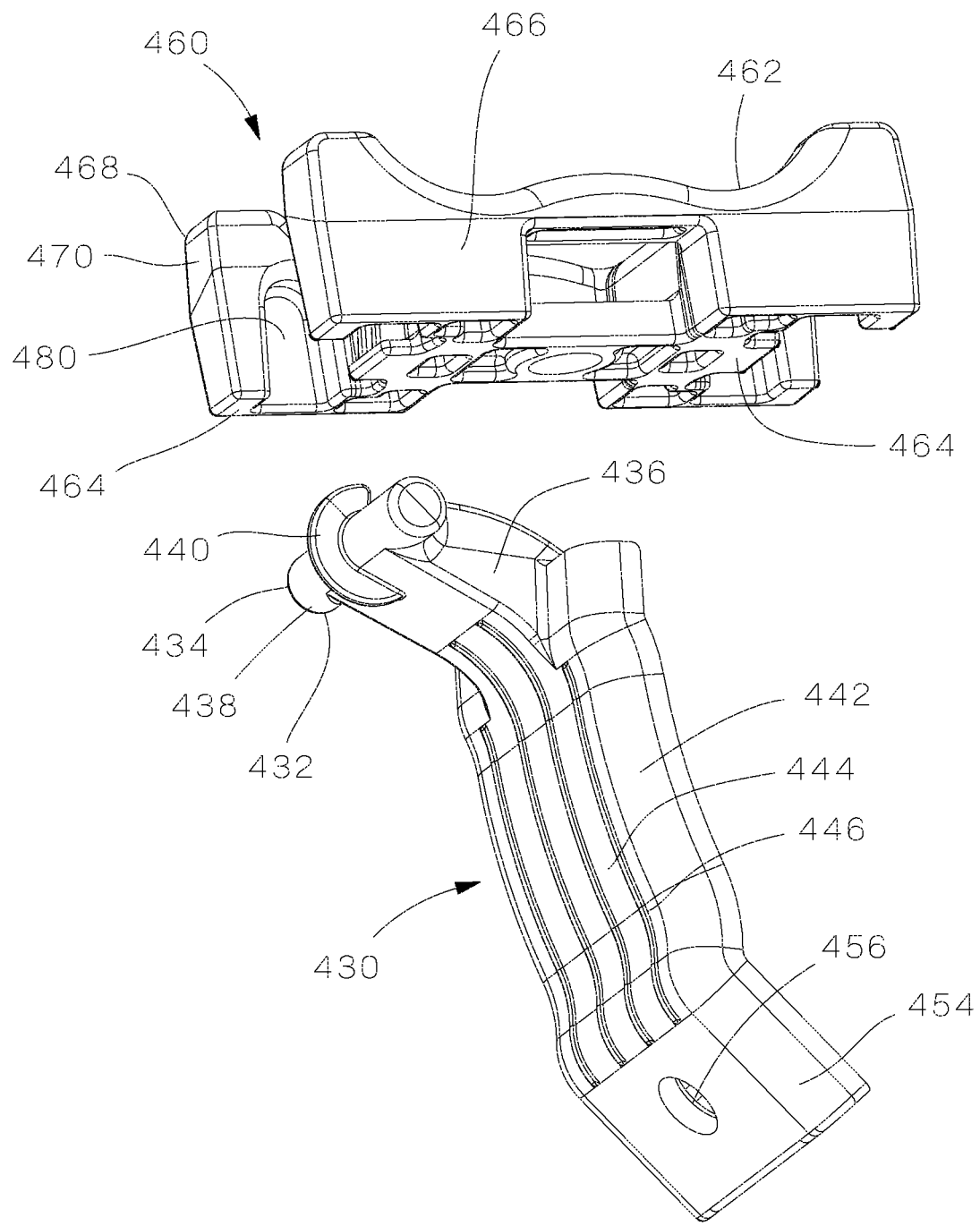
FIG. 26 is an exploded perspective view of the base and side body of FIG. 23.

As illustrated in FIG. 25, the side body 430 includes a first end 432 with a mounting member 434. The mounting member 434 includes a narrow portion 436 with a cylindrical outwardly extending peg or pin 438 and a circular rib 440 positioned along a center line of the side body 430. The circular rib 440 wraps around the peg or pin 438. Each side body 430 includes a wider curved middle section 442 with securing ribs 446 located on the inner surface 444 of the middle section (FIG. 26). The securing ribs 446 hold the cables under axial loads when the cable cleat assembly 420 is installed. The side bodies 430 also include exterior flanges 450 and a center flange 452 extending from the outer surface 448 of the middle section 442 of the side bodies 430. The wider middle section 442 leads to the second end 454. The second end 454 of each side body 430 is straight with a centered hole 456 for receiving a fastener, such as a clamping bolt.

Similar to the base in the cable cleat assemblies discussed above, the base 460 includes a hole 490 located at the center of the base 460. The hole 490 receives a fastener to secure the base 460 to a ladder rack or tray. The sides 466 of the base 460 include a bracket slot 492 located at the center of the base 460. The bracket slot 492 extends from one side 466 of the base to the opposite side 466 of the base 460 over the hole 490. The bracket slot 492 is designed to receive a bracket for mounting the base 460 on a ladder rack.

Figure 27:
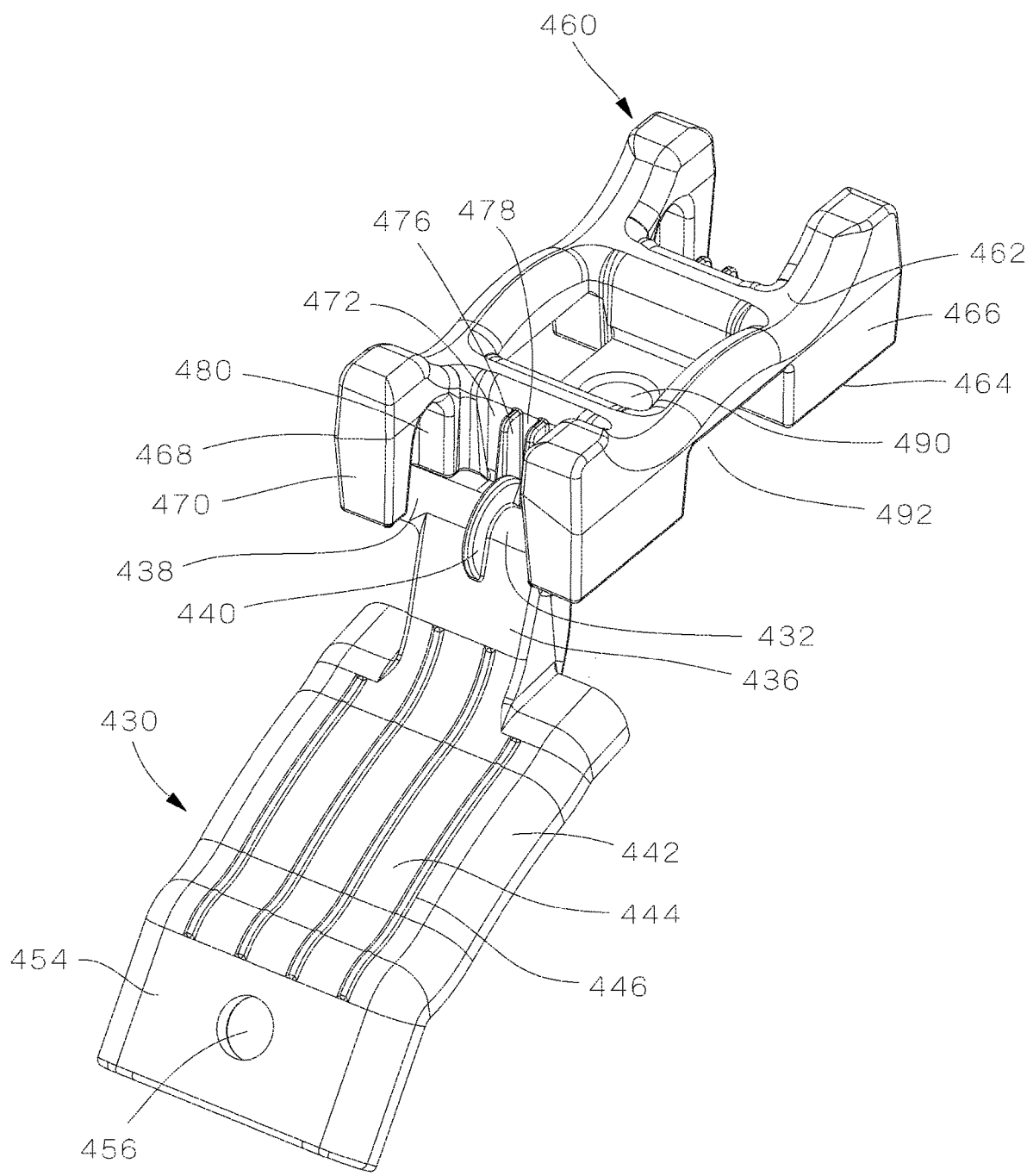
FIG. 27 is a perspective view of the assembled base and side body of FIG. 26.
Figure 28:
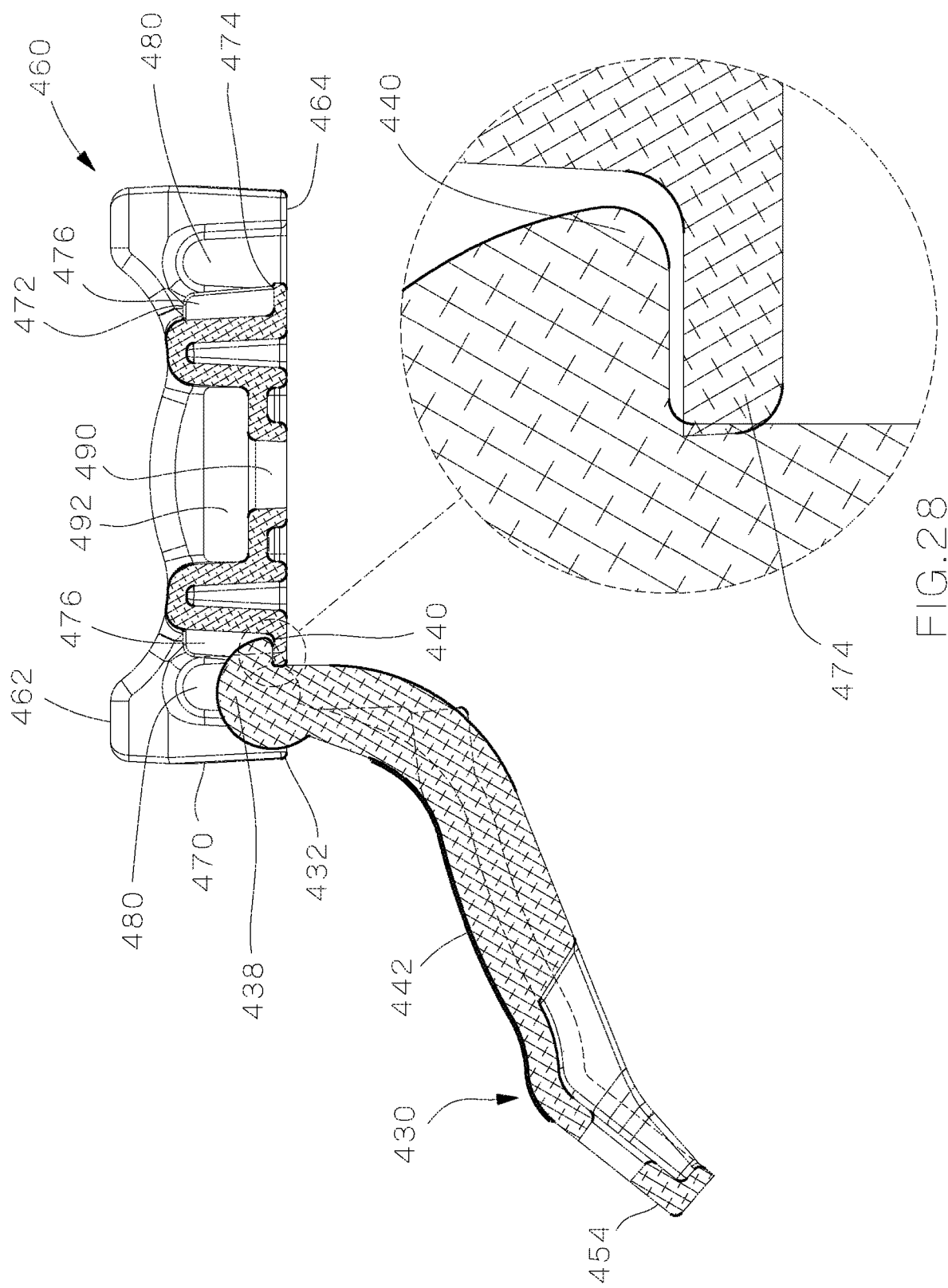
FIG. 28 is a cross sectional view of the assembled base and side body of FIG. 27.
Figure 29:
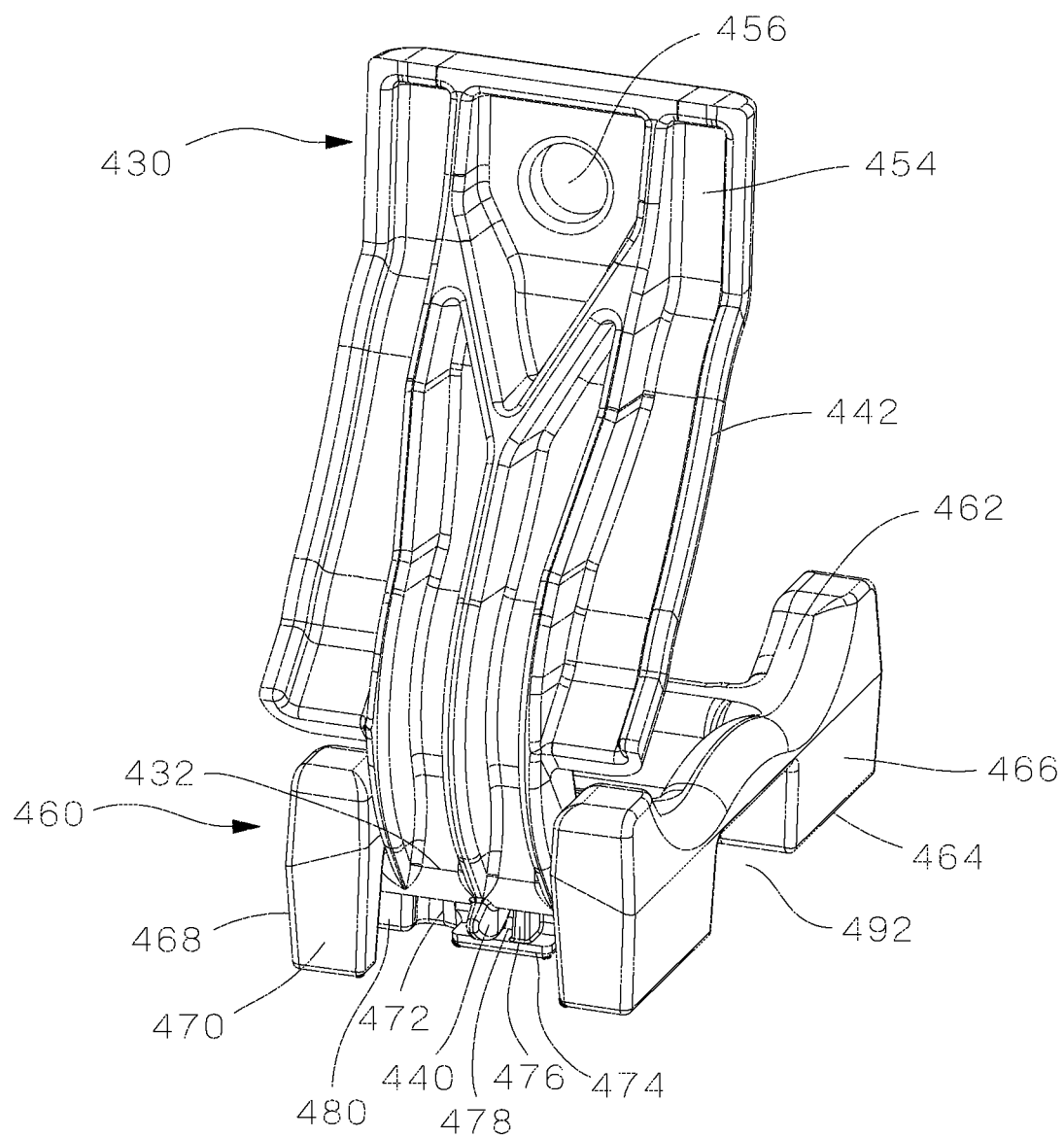
FIG. 29 is a perspective view of the assembled base and side body of FIG. 27 with the side body rotated to a closed position.

FIGS. 26-28 illustrate one of the side bodies 430 being assembled to the base 460. As illustrated in FIG. 26, the side body 430 is positioned below the base 460 with the pegs 438 aligned with the slots 480 in the base 460. The circular rib 440 is also aligned with the slot 478 between the alignment ribs 476. Once the pegs 438 are positioned in the slots 480 in the base 460, the end of the circular rib 440 is positioned above the edge of the retaining tab 474. The side body 430 is then rotated past an interference fit between the circular rib 440 and the retaining tab 474 (see FIG. 28) until the pegs 438 are fully installed in the slots 480 in the base 460. This interference fit prevents any accidental removal of the side body 430 from the base 460 of the assembled cable cleat.

The circular rib 440 aligns the side body 430 to the base 460 as it fits in the slot 478 between the two aligned ribs 476 extending from the base 460. The placement of the circular rib 440 prevents the side body 430 from twisting excessively but still allows the side body 430 to articulate from a fully open position to a fully closed position. The circular rib 440 also provides the appropriate spacing for the cable cleat assembly. The diameter of the circular rib 440 is designed to enable the side body 430 to raise when the side body 430 is pushed against the retaining tab 474 during installation. The end of the circular rib 440 acts as a leverage point during assembly and the entire side body 430 acts as a lever with a large mechanical advantage.

The second side body 430 is mounted the same way on the opposite side 466 of the base 460.

The alternative cable cleat assembly illustrated in FIGS. 23-29 is inexpensive and easy to manufacture and assemble. The side bodies are secured and retained in the base without using tools. The new retaining tab, alignment ribs, and circular rib improve the alignment and spacing of the side bodies with respect to the base.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A cable cleat assembly for securing cables to a ladder rack, the cable cleat assembly comprising:
   a base with a top, a bottom, sides, and two open ends; wherein each open end includes a retaining tab with alignment ribs extending from the end; and
   two side bodies, each side body is pivotally mounted to the base;
   wherein each side body has a first end, a middle section, and a second end; each first end has a mounting member, the mounting member having a peg extending from each side of the mounting member and a circumferential rib extending around the mounting member.

2. The cable cleat assembly of claim 1, wherein the base including slots accessible from a bottom of the base, the pegs extending from the side bodies are mounted in the slots.

3. The cable cleat assembly of claim 1, wherein the circular rib of each side body is positioned between the alignment ribs extending from each end of the base to enable each side body to pivot from an open position to a closed position.

4. The cable cleat assembly of claim 1, wherein the middle section of each side body includes securing ribs located on an inner surface of the middle section.

5. The cable cleat assembly of claim 4, wherein the securing ribs maintain the cables under axial loads when the cable cleat assembly is installed.

6. The cable cleat assembly of claim 1, wherein the second end of each side body includes a hole for receiving a fastener to secure the side bodies in a closed position.

7. The cable cleat assembly of claim 1, wherein the base includes a center hole and a center slot that extends from one side to the opposite side over the hole, wherein a fastener installed through the center hole directly secures the base to the ladder rack.

8. The cable cleat assembly of claim 1, wherein the base includes a center hole and a center slot that extends from one side to the opposite side over the hole, further comprising a bracket for securing the base to the ladder rack through the center slot.

* * * * *